US012745221B2

(12) United States Patent
Takeda et al.

(10) Patent No.: US 12,745,221 B2
(45) Date of Patent: Sep. 22, 2026

(54) SIDELINK BEAM MANAGEMENT BASED ON REFERENCE SIGNAL AND SIDELINK CHANNEL TRANSMISSIONS

(71) Applicant: QUALCOMM Incorporated, San Diego, CA (US)

(72) Inventors: Kazuki Takeda, Minato-ku (JP); Jelena Damnjanovic, Del Mar, CA (US); Sony Akkarakaran, Poway, CA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 18/509,194

(22) Filed: Nov. 14, 2023

(65) Prior Publication Data

US 2024/0334399 A1 Oct. 3, 2024

Related U.S. Application Data

(60) Provisional application No. 63/493,984, filed on Apr. 3, 2023.

(51) Int. Cl.
*H04W 76/19* (2018.01)
*H04L 5/00* (2006.01)
(Continued)

(52) U.S. Cl.
CPC ......... *H04W 72/044* (2013.01); *H04L 5/0048* (2013.01); *H04W 24/08* (2013.01); *H04W 72/40* (2023.01); *H04W 76/19* (2018.02)

(58) Field of Classification Search
CPC ... H04W 72/044; H04W 72/40; H04W 76/19; H04W 76/14; H04W 92/18;
(Continued)

(56) References Cited

U.S. PATENT DOCUMENTS

2020/0228180 A1* 7/2020 Zhang ................ H04B 7/06958
2021/0336688 A1* 10/2021 Lee ....................... H04W 48/16
(Continued)

FOREIGN PATENT DOCUMENTS

WO WO-2024169396 A1 * 8/2024 .......... H04W 72/046

OTHER PUBLICATIONS

3GPP TSG RAN WG1 Meeting #96, R1-1902439 Athens, Greece, Feb. 25 to Mar. 1, 2019 (Year: 2019).*
(Continued)

*Primary Examiner* — Christopher M Crutchfield
*Assistant Examiner* — Syed Ahmed
(74) *Attorney, Agent, or Firm* — Holland & Hart LLP

(57) ABSTRACT

Methods, systems, and devices for wireless communication are described. Sidelink user equipment (UE) may perform a sidelink beam management procedure in accordance with a sidelink beam management configuration. A first UE may receive sidelink reference signals via a first set of time-frequency resources. As part of the sidelink beam management procedure, the first UE may transmit a sidelink message including feedback and beam management information (e.g., measurements) corresponding to the sidelink reference signals, which a second UE may use for the sidelink beam management procedure. In addition, the first UE may receive a set of demodulation reference signals (DMRSs) associated with a sidelink channel via a second set of time-frequency resources which may be non-overlapping, or at least partially overlapping, with the first set of time-frequency resources. The first UE may use the sidelink reference signals, the DMRSs, or both for sidelink beam management.

21 Claims, 21 Drawing Sheets

(51) Int. Cl.

| | |
|---|---|
| ***H04W 24/08*** | (2009.01) |
| ***H04W 72/044*** | (2023.01) |
| ***H04W 72/40*** | (2023.01) |

(58) Field of Classification Search

CPC . H04L 5/0048; H04B 7/0695; H04B 7/06954; H04B 7/088

USPC ........................................................... 350/252

See application file for complete search history.

(56) References Cited

U.S. PATENT DOCUMENTS

2021/0392634 A1* 12/2021 Guo ...................... H04L 5/0053
2022/0007448 A1 1/2022 Ryu et al.
2022/0330186 A1* 10/2022 Jiao ......................... H04W 4/46
2022/0345901 A1 10/2022 Wang et al.
2022/0399917 A1* 12/2022 Shin ..................... H04B 7/0408
2022/0399927 A1* 12/2022 Tsai ..................... H04B 7/0617
2023/0109947 A1* 4/2023 Parkvall ............... H04J 11/0079 455/418
2023/0217384 A1* 7/2023 Noh ................... H04B 7/06954 370/503
2023/0254025 A1* 8/2023 Kumar .................. H04W 24/10 370/252
2023/0284054 A1* 9/2023 Zhou ..................... H04L 5/0094 370/252
2025/0185040 A1* 6/2025 Lin ................... H04W 72/1215
2025/0310948 A1* 10/2025 Lin ....................... H04L 5/0051
2025/0374318 A1* 12/2025 Zhang ................... H04W 72/02

OTHER PUBLICATIONS

ETSI TR 137 985 V16.0.0 (Jul. 2020); LTE; 5G; Overall description of Radio Access Network (RAN) aspects for Vehicle-to-everything (V2X) based on LTE and NR (Year: 2020).*

5G; Study on New Radio (NR) access technology (3GPP TR 38.912 version 17.0.0 Release 17) Study on New Radio (NR) access technology (Year: 2022).*

International Search Report and Written Opinion—PCT/US2024/019920—ISA/EPO—Jul. 11, 2024.

* cited by examiner 615-a
605-a
605-b
615-b
605-c
Time
610-a
Time-frequency resources 610-b
610-c
Time-frequency resources 620-a
Time-frequency Resource 620-b 625-a Transmit Beam 1
625-b Transmit Beam 2
625-c Transmit Beam 3
625-d Transmit Beam 4

600

AGC
Symbol
Frequency
Sidelink data 630
Sidelink reference signals 635
Slot

Receive, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration

1805

Receive, from the second UE via a second set of time-frequency resources, a set of multiple demodulation reference signals associated with a sidelink channel, where the second set of time-frequency resources at least partially overlaps the set of time-frequency resources

1810

Transmit, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration

1815

1800

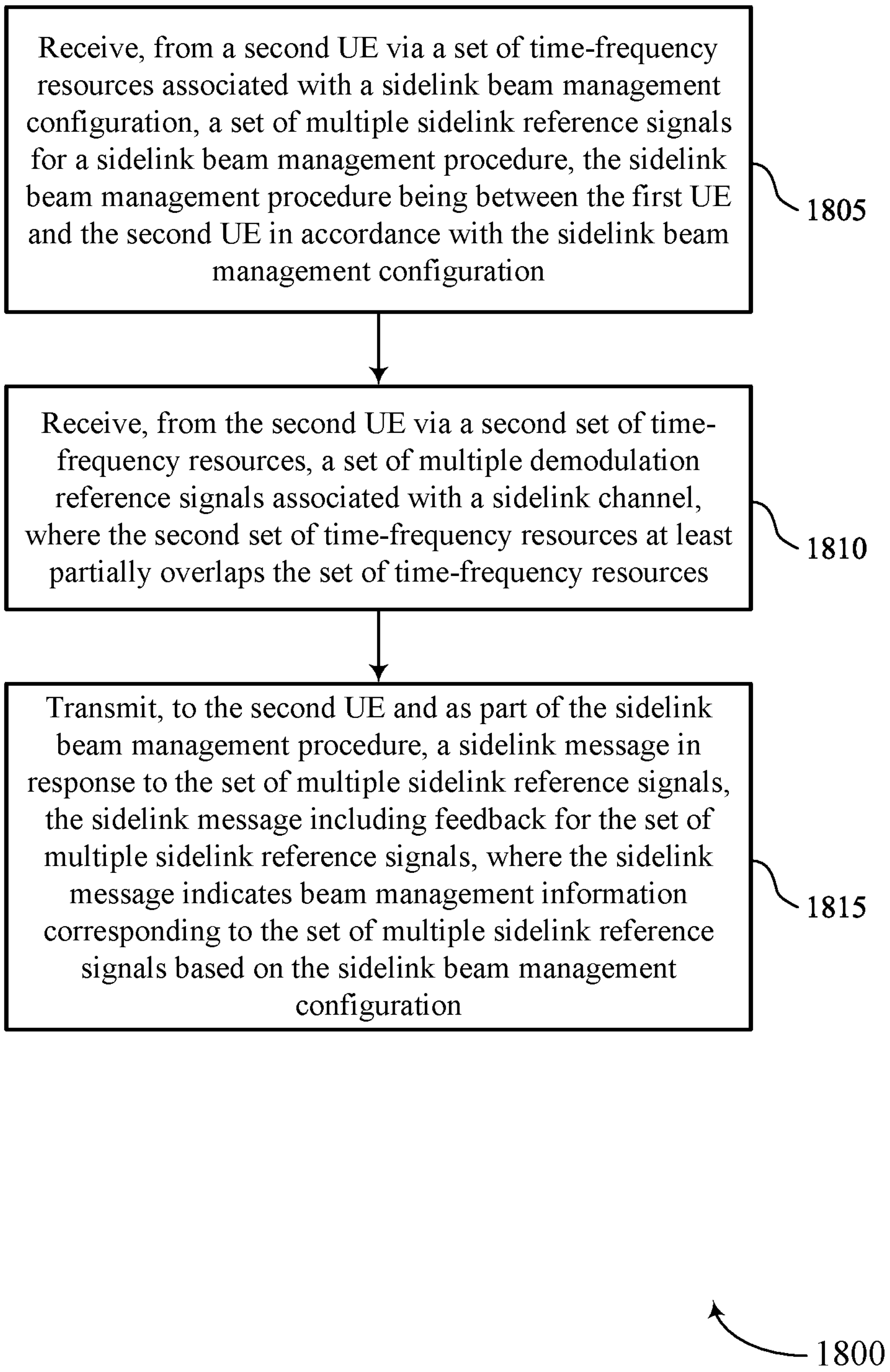

FIG. 18

Transmit, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration

1905

Receive, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration

1910

1900

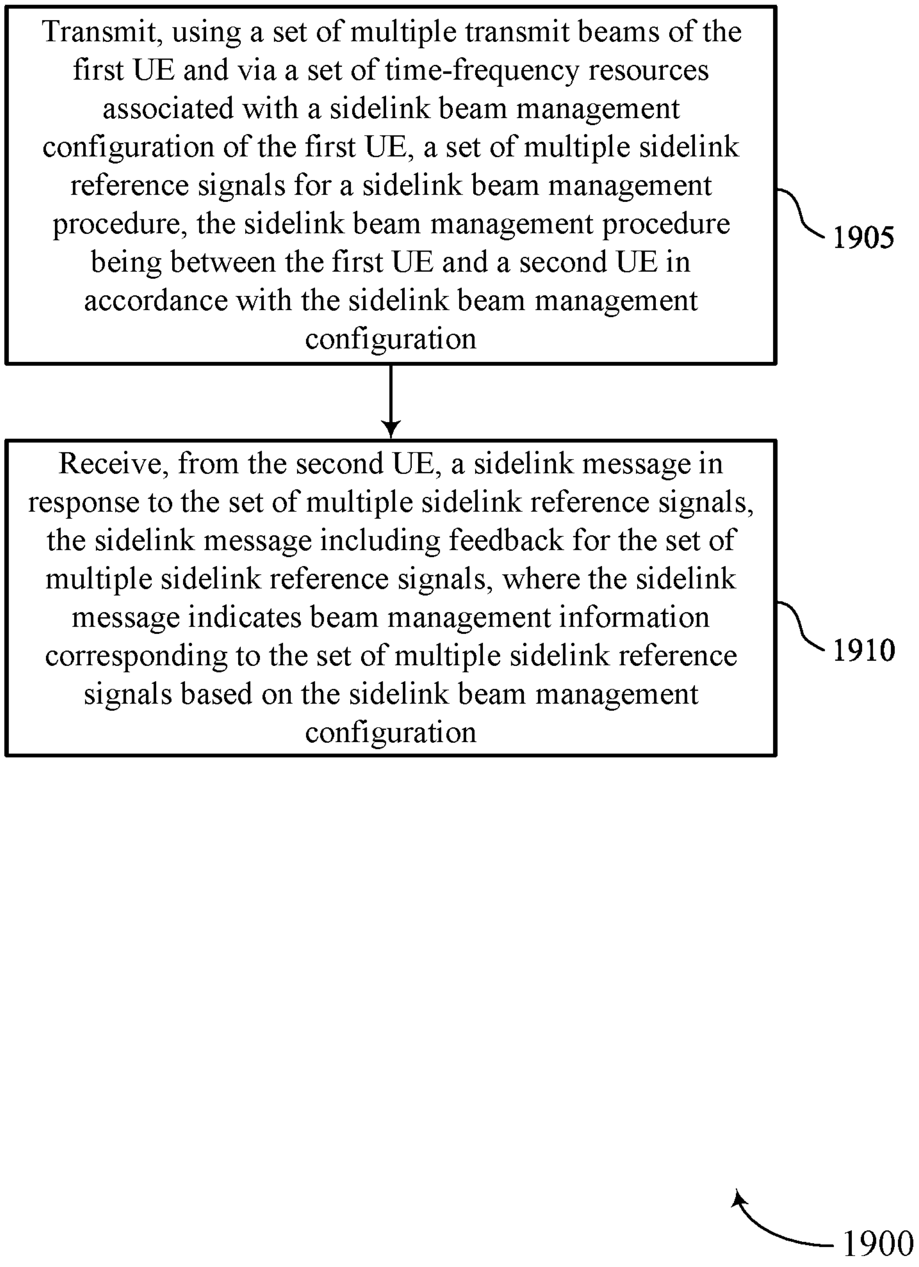

FIG. 19

Transmit, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration

2005

Transmit, using the set of multiple transmit beams and via a second set of time-frequency resources, a set of multiple demodulation reference signals associated with a sidelink channel, where the set of multiple sidelink reference signals and a set of multiple sidelink channels associated with the set of multiple demodulation reference signals are time division multiplexed in a slot

2010

Receive, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration

2015

2000

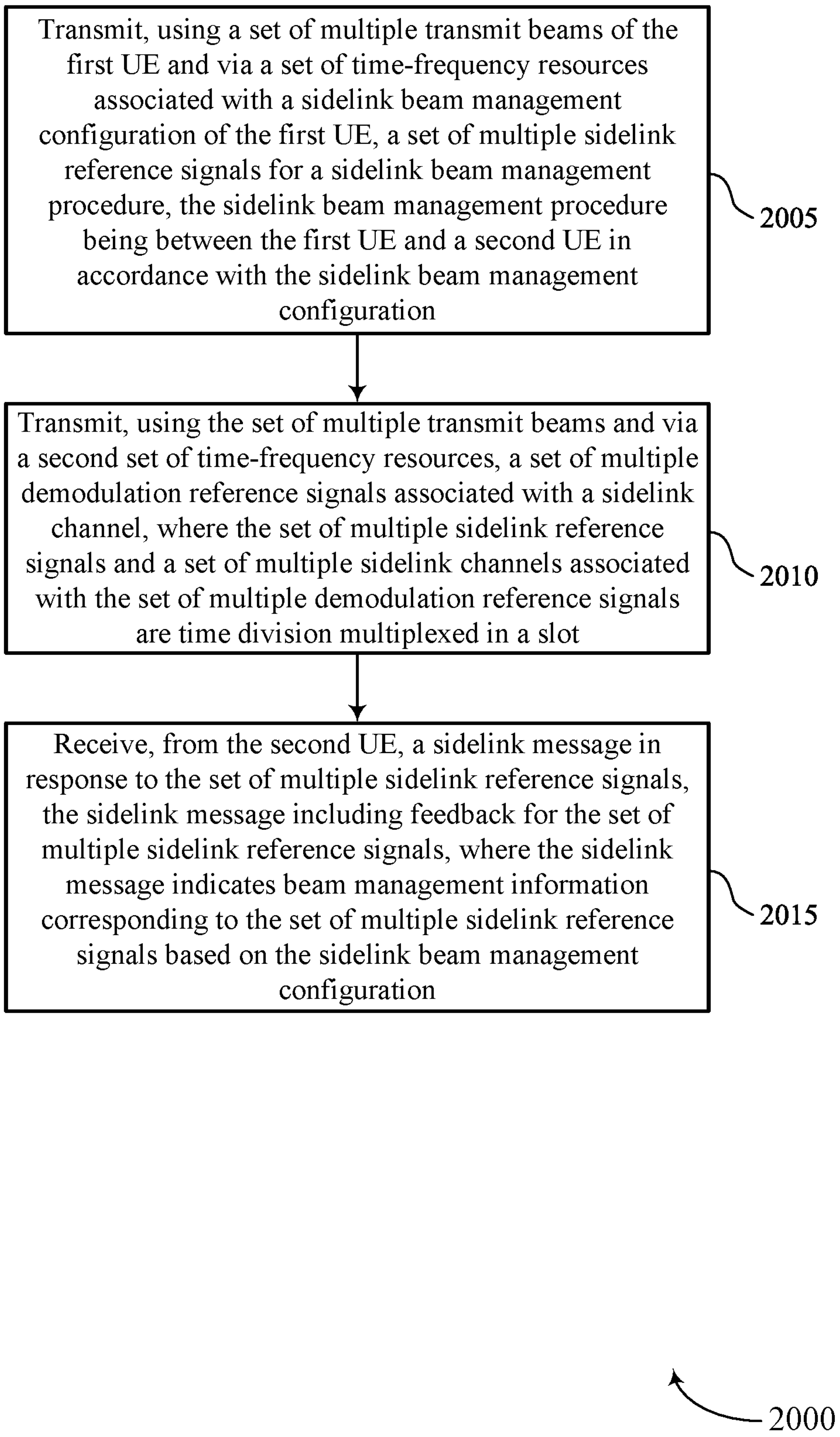

FIG. 20

Transmit, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration

2105

Transmit, using the set of multiple transmit beams and via a second set of time-frequency resources, one or more demodulation reference signals of a set of multiple demodulation reference signals associated with a sidelink channel via a subset of a second set of time-frequency resources, where the subset overlaps the set of time-frequency resources

2110

Receive, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration

2115

2100

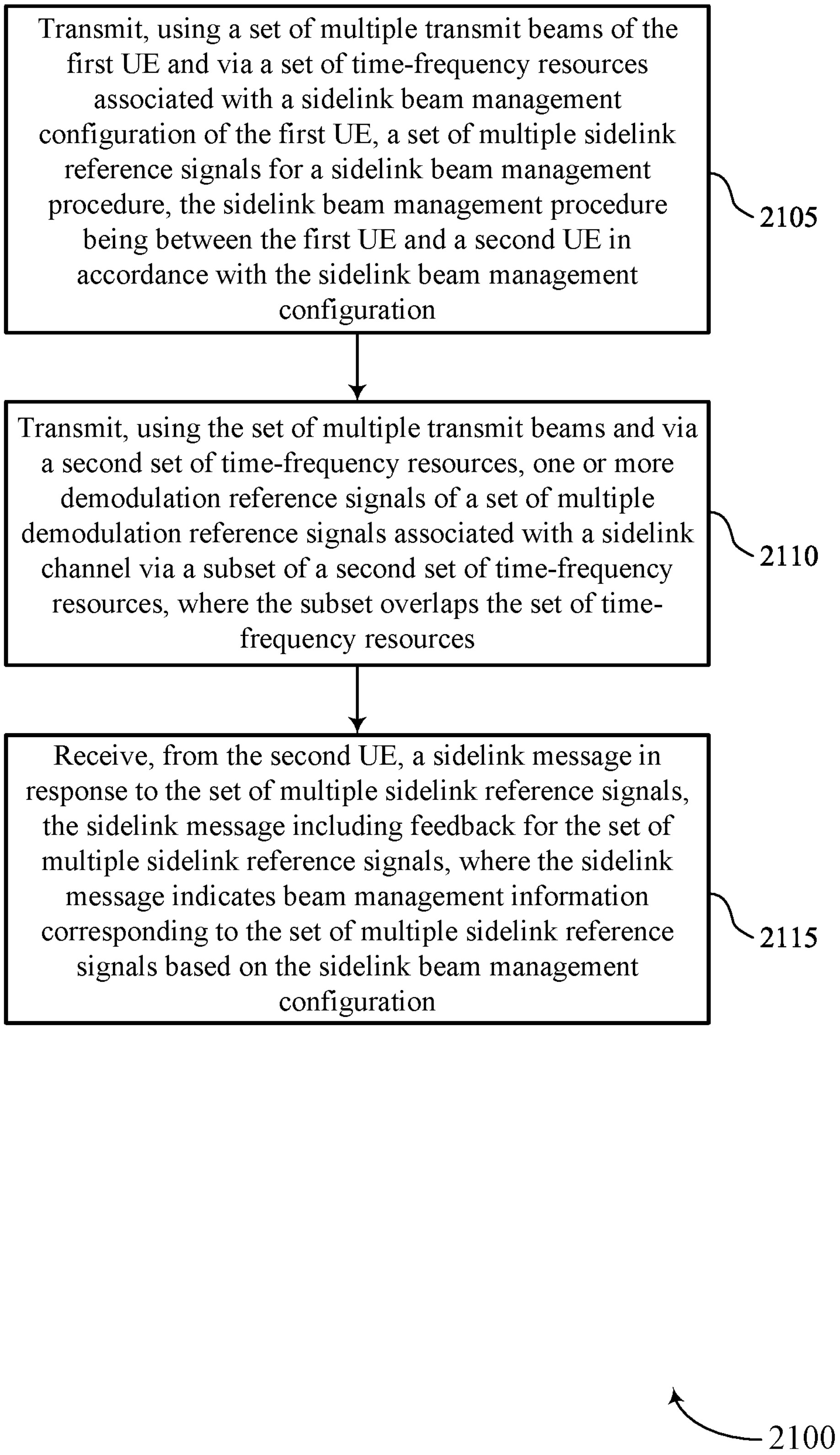

FIG. 21

SIDELINK BEAM MANAGEMENT BASED ON REFERENCE SIGNAL AND SIDELINK CHANNEL TRANSMISSIONS

CROSS REFERENCE

The present Application for Patent claims the benefit of U.S. Provisional Patent Application No. 63/493,984 by TAKEDA et al., entitled "SIDELINK BEAM MANAGEMENT BASED ON REFERENCE SIGNAL AND SIDELINK CHANNEL TRANSMISSIONS," filed Apr. 3, 2023, assigned to the assignee hereof, and expressly incorporated by reference herein.

FIELD OF TECHNOLOGY

The following relates to wireless communication, including sidelink beam management based on reference signal and sidelink channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support sidelink beam management based on reference signal and sidelink channel transmissions. For example, the described techniques enable sidelink beam management based on sidelink reference signal and sidelink channel transmissions. In some examples of sidelink communications, a first user equipment (UE) may receive a set of multiple sidelink reference signals from a second UE, where the UEs may use the sidelink reference signals for a sidelink beam management procedure. The second UE may transmit the sidelink reference signals via a first set of time-frequency resources associated with a sidelink beam management configuration. In some examples, the first UE may transmit a sidelink message in response to receiving the sidelink reference signals. The sidelink message may include feedback for the sidelink reference signals, and may indicate beam management information corresponding to the sidelink reference signals based on the sidelink beam management configuration. That is, the first UE may report feedback and beam management information (e.g., beam measurements) that the second UE may use to perform the sidelink beam management procedure.

In some examples, the second UE may transmit a set of multiple demodulation reference signals (DMRSs) associated with a sidelink channel via a second set of time-frequency resources. If the second set of time-frequency resources is non-overlapping with the first set of time-frequency resources, then the UEs may perform a beam management procedure based on the sidelink reference signals and the first UE may receive and decode sidelink data in accordance with the DMRSs. Alternatively, if the second set of time-frequency resources partially or fully overlaps with the first set of time-frequency resources, and if the sidelink channel is associated with a same transmit beam as the sidelink reference signal associated with a time-frequency resource of the first set of time-frequency resources, the first UE may replace the time-frequency resource with the sidelink channel associated with the DMRSs.

A method for wireless communications at a first UE is described. The method may include receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration and transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

A first UE for wireless communications is described. The first UE may include one or more memories storing processor-executable code, and one or more processors coupled with the one or more memories and individually or collectively operable to execute the code to cause the first UE to receive, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration and transmit, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Another first UE for wireless communications is described. The first UE may include means for receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration and means for transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

A non-transitory computer-readable medium storing code for wireless communications at a first UE is described. The code may include instructions executable by one or more processors to receive, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration and transmit, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Some examples of the method, UEs, and non-transitory computer-readable medium described herein may further include operations, features, means, or instructions for receiving, from the second UE via a second set of time-frequency resources, a set of multiple DMRSs associated with a sidelink channel, where the second set of time-frequency resources may be non-overlapping with the set of time-frequency resources.

Some examples of the method, UEs, and non-transitory computer-readable medium described herein may further include operations, features, means, or instructions for performing the sidelink beam management procedure using the set of multiple sidelink reference signals, the set of multiple DMRSs, or both.

Some examples of the method, UEs, and non-transitory computer-readable medium described herein may further include operations, features, means, or instructions for performing a received power measurement procedure for the set of multiple sidelink reference signals, the set of multiple DMRSs, or a combination thereof, where the sidelink message indicates one or more received power measurements associated with the received power measurement procedure.

In some examples of the method, UEs, and non-transitory computer-readable medium described herein, the feedback indicates resources associated with a reference signal measurement that exceeds a measurement threshold.

Some examples of the method, UEs, and non-transitory computer-readable medium described herein may further include operations, features, means, or instructions for performing a received power measurement procedure for the set of multiple sidelink reference signals, the set of multiple DMRSs, or a combination thereof and initiating a beam failure recovery (BFR) procedure based on a beam failure that may be triggered based on one or more reference signal measurements and a measurement threshold.

Some examples of the method, UEs, and non-transitory computer-readable medium described herein may further include operations, features, means, or instructions for decoding a set of multiple sidelink channels associated with the set of multiple DMRSs and initiating a BFR procedure based on a beam failure that may be triggered based on the decoding of the set of multiple sidelink channels and an error threshold.

In some examples of the method, UEs, and non-transitory computer-readable medium described herein, the set of multiple sidelink reference signals and a set of multiple sidelink channels associated with the set of multiple DMRSs may be time division multiplexed (TDMed) in a slot.

Some examples of the method, UEs, and non-transitory computer-readable medium described herein may further include operations, features, means, or instructions for receiving, from the second UE via a second set of time-frequency resources, a set of multiple DMRSs associated with a sidelink channel, where the second set of time-frequency resources at least partially overlaps the set of time-frequency resources.

In some examples of the method, UEs, and non-transitory computer-readable medium described herein, receiving the set of multiple DMRSs may include operations, features, means, or instructions for receiving one or more DMRSs of the set of multiple DMRSs via a subset of the second set of time-frequency resources, where the subset overlaps the set of time-frequency resources.

In some examples of the method, UEs, and non-transitory computer-readable medium described herein, a time-frequency resource of the set of time-frequency resources may be replaced with the sidelink channel associated with the set of multiple DMRSs based on the sidelink channel being associated with a same transmit beam as a sidelink reference signal associated with the time-frequency resource.

In some examples of the method, UEs, and non-transitory computer-readable medium described herein, the set of multiple sidelink reference signals may be received semi-persistently, aperiodically, or according to a periodicity based on the sidelink beam management configuration.

A method for wireless communications at a first UE is described. The method may include transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration and receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

A first UE for wireless communications is described. The first UE may include one or more memories storing processor-executable code, and one or more processors coupled with the one or more memories and individually or collectively operable to execute the code to cause the first UE to transmit, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration and receive, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Another first UE for wireless communications is described. The first UE may include means for transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration and means for receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

A non-transitory computer-readable medium storing code for wireless communications at a first UE is described. The code may include instructions executable by one or more processors to transmit, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration and receive, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Some examples of the method, UEs, and non-transitory computer-readable medium described herein may further include operations, features, means, or instructions for transmitting, using the set of multiple transmit beams and via a second set of time-frequency resources, a set of multiple DMRSs associated with a sidelink channel, where the second set of time-frequency resources may be non-overlapping with the set of time-frequency resources.

In some examples of the method, UEs, and non-transitory computer-readable medium described herein, the sidelink beam management procedure may be based on the set of multiple sidelink reference signals, the set of multiple DMRSs, or both.

In some examples of the method, UEs, and non-transitory computer-readable medium described herein, the feedback indicates a set of multiple received power measurements associated with the set of multiple transmit beams based on the set of multiple sidelink reference signals, the set of multiple DMRSs, or both.

In some examples of the method, UEs, and non-transitory computer-readable medium described herein, the feedback indicates resources associated with at least one transmit beam of the set of multiple transmit beams based on the set of multiple sidelink reference signals, the set of multiple DMRSs, or both.

In some examples of the method, UEs, and non-transitory computer-readable medium described herein, the set of multiple sidelink reference signals and a set of multiple sidelink channels associated with the set of multiple DMRSs may be TDMed in a slot.

Some examples of the method, UEs, and non-transitory computer-readable medium described herein may further include operations, features, means, or instructions for transmitting, using the set of multiple transmit beams and via a second set of time-frequency resources, a set of multiple DMRSs associated with a sidelink channel, where the second set of time-frequency resources at least partially overlap the set of time-frequency resources.

In some examples of the method, UEs, and non-transitory computer-readable medium described herein, transmitting the set of multiple DMRSs may include operations, features, means, or instructions for transmitting one or more DMRSs of the set of multiple DMRSs via a subset of the second set of time-frequency resources, where the subset overlaps the set of time-frequency resources.

In some examples of the method, UEs, and non-transitory computer-readable medium described herein, a time-frequency resource of the set of time-frequency resources may be replaced with the sidelink channel associated with the set of multiple DMRSs based on the sidelink channel being associated with a same transmit beam as a sidelink reference signal associated with the time-frequency resource.

In some examples of the method, UEs, and non-transitory computer-readable medium described herein, the set of multiple sidelink reference signals may be transmitted semi-persistently, aperiodically, or according to a periodicity based on the sidelink beam management configuration.

BRIEF DESCRIPTION OF THE DRAWINGS

FIGS. 16 through 21 show flowcharts illustrating methods that support sidelink beam management based on reference signal and sidelink channel transmissions in accordance with one or more aspects of the present disclosure.

DETAILED DESCRIPTION

Figure 1:
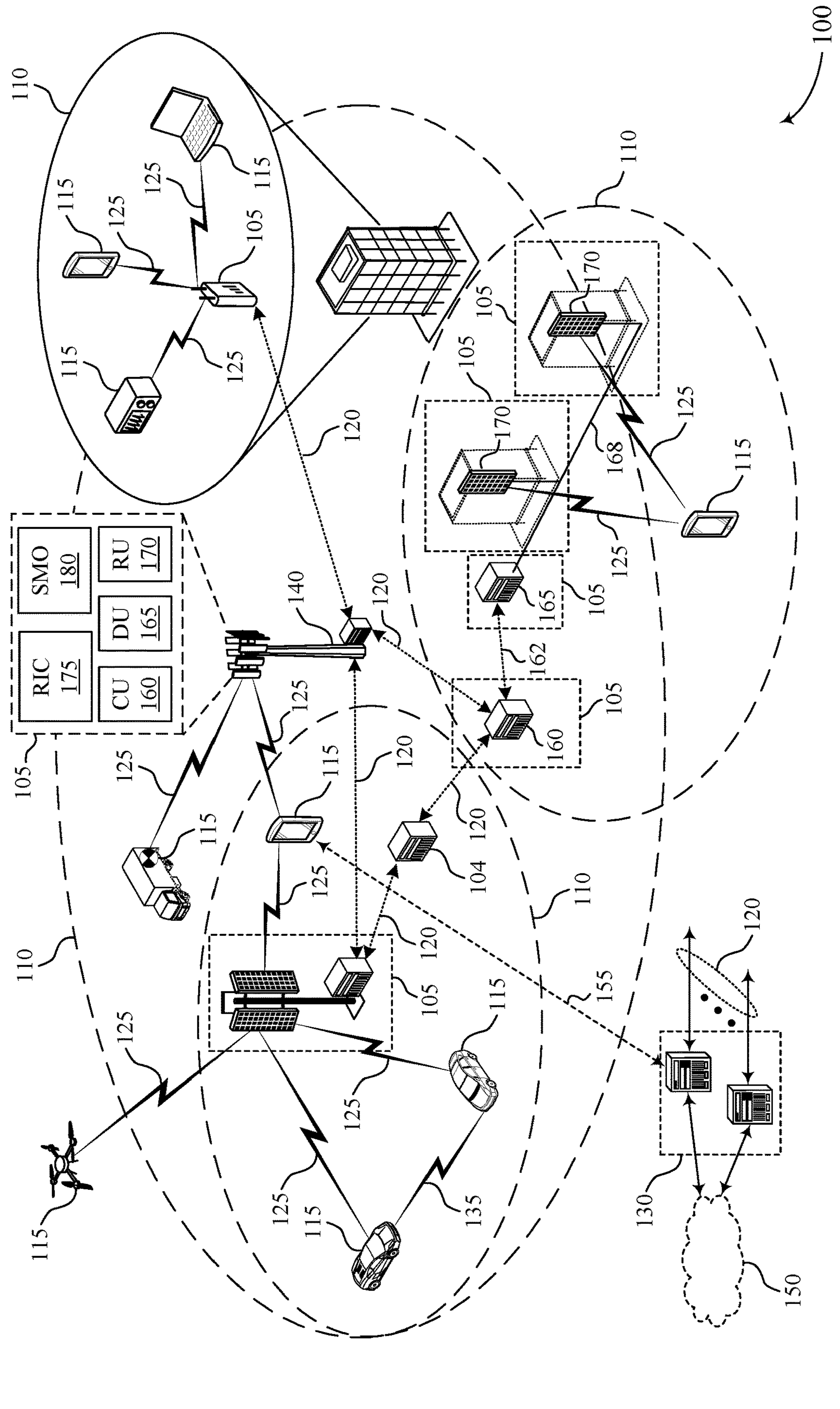
FIG. 1 shows an example of a wireless communications system that supports sidelink beam management based on reference signal and sidelink channel transmissions in accordance with one or more aspects of the present disclosure.

A user equipment (UE) and a network entity (e.g., a base station) may utilize beam management procedures to maintain or improve signaling quality. For example, the network entity may transmit reference signals to the UE using multiple transmit beams, the UE may receive and measure the reference signals, and the UE may transmit feedback to the network entity. The network entity may use the feedback as part of a beam management procedure. For example, the network entity may select transmit and receive beams to use for communications with the UE based on the feedback. UEs performing sidelink communications may benefit from performing sidelink beam management procedures. However, such sidelink beam management procedures may rely on sidelink reference signals that may increase signaling overhead for the UEs (e.g., if there is data to communicate above a threshold amount of data). Alternatively, a UE may transmit sidelink channels (e.g., physical sidelink shared channel (PSSCH), physical sidelink control channel (PSCCH)) with demodulation reference signals (DMRSs) using multiple transmit beams, and another UE may receive and measure the DMRSs to perform sidelink beam management. However, such techniques may be useful to limited scenarios when the sidelink UEs have sufficient data to communicate, which may be infrequent.

The techniques described herein enable sidelink beam management based on sidelink reference signal and sidelink channel transmissions. In some examples, a receive UE may receive a set of multiple sidelink reference signals (e.g., synchronization signal block (SSB) or SSB-like signals) from a transmit UE. The transmit UE may transmit the sidelink reference signals via a first set of time-frequency resources associated with a sidelink beam management configuration. In addition, the transmit UE and the receive UE may use the sidelink reference signals for a sidelink beam management procedure in accordance with the sidelink beam management configuration. In some examples, the receive UE may transmit a sidelink message in response to receiving the sidelink reference signals. The sidelink message may include feedback for the sidelink reference signals, and may indicate beam management information corresponding to the sidelink reference signals based on the sidelink beam management configuration. That is, the receive UE may report feedback and beam management information (e.g., beam measurements) that the transmit UE may use to perform the sidelink beam management procedure.

Additionally, the transmit UE may transmit a set of multiple DMRSs associated with a sidelink channel via a second set of time-frequency resources. If the second set of time-frequency resources is non-overlapping with the first set of time-frequency resources, then the UEs may perform a beam management procedure based on the sidelink reference signals and the receive UE may receive and decode sidelink data in accordance with the DMRSs. Alternatively, if the second set of time-frequency resources partially or fully overlaps with the first set of time-frequency resources, and if the sidelink channel is associated with a same transmit beam as the sidelink reference signal associated with a time-frequency resource of the first set of time-frequency resources, the receive UE may replace the time-frequency resource with the sidelink channel associated with the DMRSs. In this way, the receive UE may receive one or more DMRSs.

Aspects of the disclosure are initially described in the context of wireless communications systems. Aspects of the disclosure are then described in the context of transmission schemes, resource configurations, and process flows. Aspects of the disclosure are further illustrated by and described with reference to apparatus diagrams, system diagrams, and flowcharts that relate to sidelink beam management based on reference signal and sidelink channel transmissions.

FIG. 1 shows an example of a wireless communications system 100 that supports sidelink beam management based on reference signal and sidelink channel transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (cNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sidelink beam management based on reference signal and sidelink channel transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz), or 100, 200, 400, or 800 MHz for frequency range 2 (FR2) and millimeter wave communications). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

For uplink and downlink communications (e.g., Uu communications) between a UE 115 and a network entity 105, the UE 115 and the network entity 105 may perform beam management procedures based on reference signals such as SSBs or CSI-RSs. For example, a network entity 105 may transmit an SSB, a CSI-RS, or both over multiple transmit beams, and the UE 115 may measure the reference signals to determine transmit and receive beams. Since each SSB and CSI-RS may span few symbols, the network entity 105 may enable beam sweeping over short periods of time.

UEs 115 performing sidelink communications may use a similar approach to perform sidelink beam management procedures. For example, a transmit UE 115 may transmit a new or enhanced sidelink reference signal or sidelink channel (e.g., sidelink SSBs, sidelink CSI-RSs) over multiple transmit beams, and receive UEs 115 may measure the sidelink reference signals to determine transmit and receive beams. A UE 115 may design such a sidelink reference signal to span few symbols to enable beam sweeping over short periods of time, such as in the Uu case. In some examples of sidelink beam management, each receive UE 115 may observe a variation in quality of the received reference signals with different beams on different occasions. In addition, a receive UE 115 may select a reference signal or channel (and its corresponding occasion) that is associated with a preferred transmit beam of the transmit UE 115 and respond to the transmit UE 115 accordingly. The receive UE 115 may select the reference signal or channel based on a reference signal receive power (RSRP) of the reference signal or a decoding result of the message carried by the reference signal. In some cases, the response from the receive UE 115 to the transmit UE 115 may be a reference signal transmitted via a resource or occasion associated with the selected reference signal occasion.

Alternatively, the UEs 115 may perform sidelink beam management procedures based on sidelink channels (e.g., PSSCH, PSCCH) with DMRSs. For example, a transmit UE 115 may transmit multiple sidelink channels with DMRSs over multiple beams, where the sidelink channels may carry sidelink data. Each sidelink channel with a DMRS may span one slot in accordance with the structure of a PSSCH or a PSCCH. Therefore, the transmit UE 115 may use up to one beam per slot for sidelink channel transmission and reception. In some examples, multiple PSSCHs may carry the same data (e.g., a data repetition). In addition, the receive UE 115 may utilize one or more physical sidelink feedback channel (PSFCH) resources for each transmitted (or received) sidelink channel to transmit HARQ-acknowledgement (ACK) feedback for the sidelink data carried in each sidelink channel.

In such cases, the receive UE 115 may monitor and receive the control channel with the DMRSs that are transmitted over multiple beams. The receive UE 115 may observe a variation of quality of the received sidelink channel with the DMRS on different beams. Accordingly, the receive UE 115 may select a sidelink channel with a DMRS that is associated with a preferred transmit beam (corresponding to the transmit UE 115), and the receive UE 115 may respond by transmitting HARQ-ACK feedback via a PSFCH resource associated with the selected sidelink channel. The receive UE 115 may select the sidelink channel with the DMRS based on a measured RSRP of the DMRS, a sidelink channel decoding result, or both.

The wireless communications system 100 supports techniques for sidelink beam management based on sidelink reference signal and sidelink channel transmissions. A receive UE 115 may receive a set of multiple sidelink reference signals from a transmit UE 115 via a first set of time-frequency resources associated with a sidelink beam management configuration. The sidelink UEs 115 may use the sidelink reference signals for a sidelink beam management procedure in accordance with the sidelink beam management configuration. In some examples, the receive UE 115 may transmit a sidelink message in response to receiving the sidelink reference signals. The sidelink message may include feedback for the sidelink reference signals, and may indicate beam management information corresponding to the sidelink reference signals based on the sidelink beam management configuration. That is, the receive UE may report feedback and beam management information (e.g., beam measurements) that the transmit UE may use to perform the sidelink beam management procedure.

Figure 2:
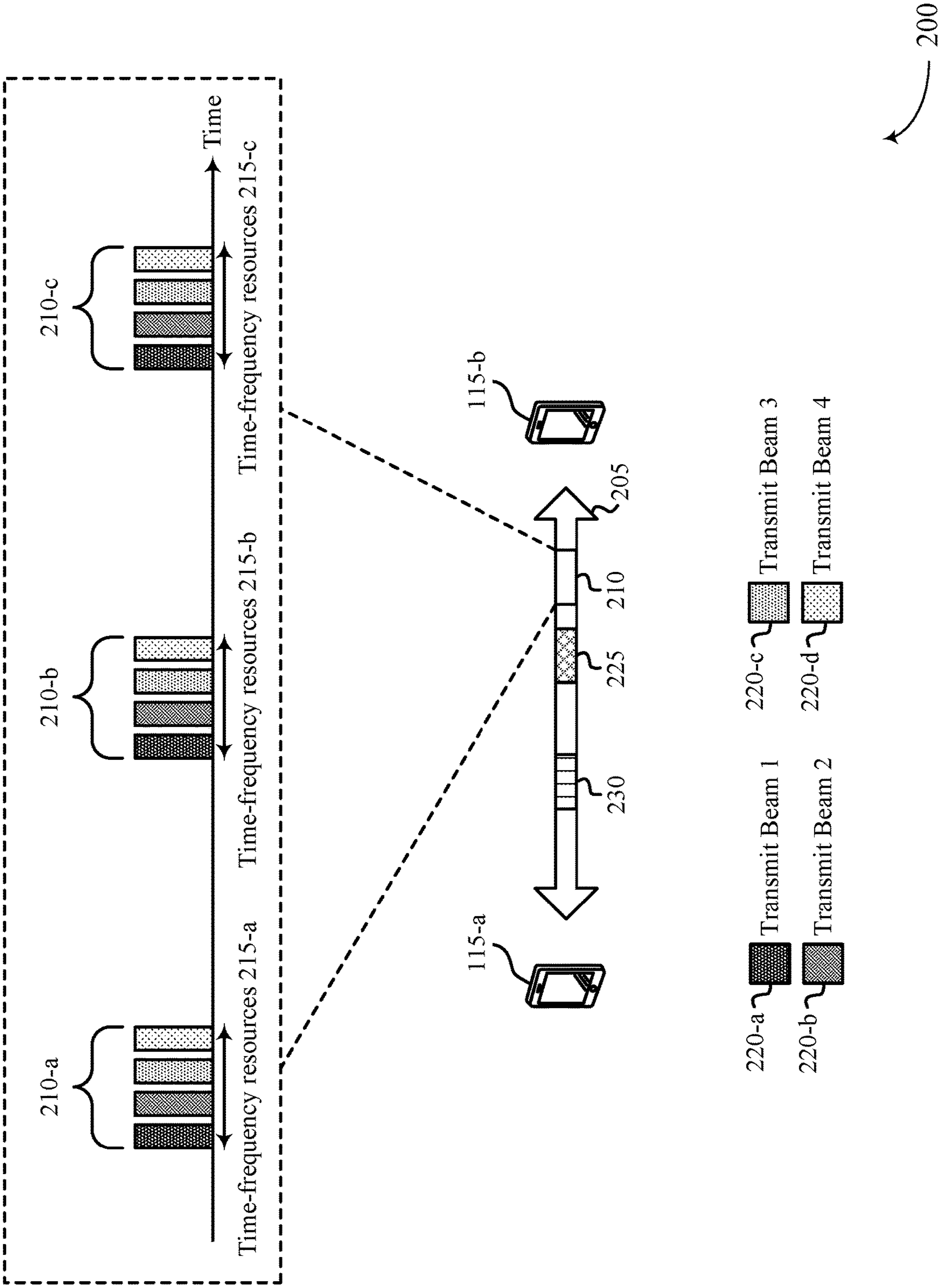
FIG. 2 shows an example of a wireless communications system that supports sidelink beam management based on reference signal and sidelink channel transmissions in accordance with one or more aspects of the present disclosure.

FIG. 2 shows an example of a wireless communications system 200 that supports sidelink beam management based on reference signal and sidelink channel transmissions in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a UE 115-*b*, which may be examples of corresponding devices described herein. The UE 115-*a* and UE 115-*b* may support sidelink communications and sidelink beam management procedures based on sidelink reference signal and sidelink channel transmissions.

The wireless communications system 200 may support communications between the UE 115-*a* and the UE 115-*b*. For example, the UEs 115 may perform sidelink communications via a communications link 205 (e.g., a sidelink), which may be an example of a communication link 125 described herein with reference to FIG. 1. As described herein, the UE 115-*a* may be referred to as a transmit UE 115 and the UE 115-*b* may be referred to as a receive UE 115, however both UEs 115 may transmit and receive communications. The UEs 115 may utilize sidelink beam management procedures to measure and determine transmit and receive beams that may maintain or improve communications. The sidelink beam management procedures may be based on sidelink reference signals 210, DMRSs 225 (e.g., PSCCH or PSSCH with DMRSs), or both.

The UE 115-*a* may transmit sidelink reference signals 210 to the UE 115-*b* and/or to one or more other UEs 115 via a set of time-frequency resources 215 associated with a sidelink beam management configuration. That is, there may be other UEs 115 monitoring the same sidelink reference signals 210 as the UE 115-*a*. The sidelink beam management configuration may be pre-configured for the UEs 115 (e.g., by a network entity 105) such that they are enabled to perform sidelink beam management procedures. In some examples, the UE 115-*a* may transmit the sidelink reference signals 210 for sidelink beam management if the UE 115-*a* lacks sidelink data to transmit. In this way, the UE 115-*a* may transmit the sidelink reference signals 210 regularly (e.g., in a quasi-periodic manner) for beam maintenance and training or some other sidelink beam management procedure between the UE 115-*a* and the UE 115-*b*.

In addition, the UE 115-*a* may transmit the sidelink reference signals 210 via transmit beams 220, and may transmit multiple sets of the sidelink reference signals 210 via different sets of time-frequency resources 215. For example, the UE 115-*a* may transmit a set of multiple sidelink reference signals 210-*a* via a transmit beam 220-*a* (e.g., transmit beam 1), a transmit beam 220-*b* (e.g., transmit beam 2), a transmit beam 220-*c* (e.g., transmit beam 3), and a transmit beam 220-*d* (e.g., transmit beam 4) via a set of time-frequency resources 215-*a*. In addition, the UE 115-*a* may transmit sidelink reference signals 210-*b* via a set of time-frequency resources 215-*b* and sidelink reference signals 210-*c* via a set of time-frequency resources 215-*c* via multiple transmit beams 220.

In some cases, the UE 115-*a* may transmit DMRSs 225 associated with a sidelink channel (e.g., PSSCH, PSCCH) via a second set of time-frequency resources. In some examples, the UE 115-*a* may transmit the DMRSs 225 when the UE 115-*a* has sidelink data to transmit, and as such the DMRSs 225 may enable the UE 115-*b* to decode or demodulate sidelink data carried via the sidelink channel. In some examples, the UE 115-*a* may repeat (or transmit repetitions of) the sidelink data over multiple sidelink channels using multiple transmit beams 220 such that the DMRSs 225 enable sidelink beam maintenance and training. The transmission of the sidelink reference signals 210 and the DMRSs 225 is further described herein with reference to FIG. 3.

The UE 115-*b* may use the sidelink reference signals 210, the DMRSs 225, or both to perform the sidelink beam management procedure, which may include initial beam pairing, initial beam search, beam maintenance and training, beam measurements, beam prediction, beam failure recovery (BFR), and the like. As part of the sidelink beam management procedure, and in response to receiving the sidelink reference signals 210, the UE 115-*b* may transmit a sidelink message 230 to the UE 115-*a*. The sidelink message 230 may include feedback for the sidelink reference signals 210. In addition, the sidelink message 230 may indicate beam management information (e.g., beam measurements, selected beams, and the like) corresponding to the sidelink reference signals 210 based on the sidelink beam management configuration. In some examples, as described herein with reference to FIGS. 3-6, the UE 115-*a* may perform the sidelink beam management procedure using the sidelink reference signals 210, the DMRSs 225 or both based on whether the sets of time-frequency resources 215 overlap with the second set of time-frequency resources (via which the DMRSs 225 are transmitted).

Figure 3:
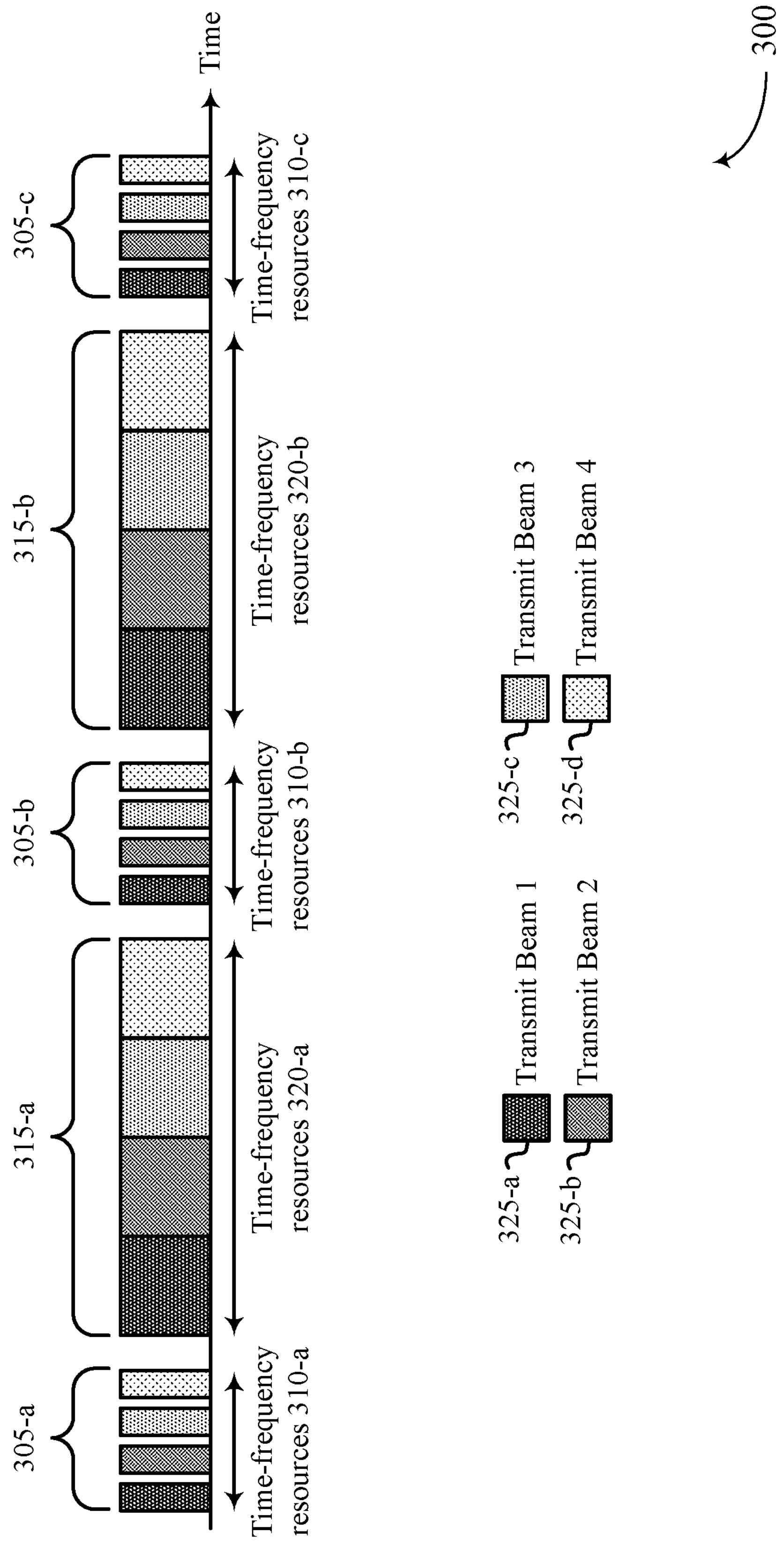
FIG. 3 shows an example of a transmission scheme that supports sidelink beam management based on reference signal and sidelink channel transmissions in accordance with one or more aspects of the present disclosure.

FIG. 3 shows an example of a transmission scheme 300 that supports sidelink beam management based on reference signal and sidelink channel transmissions in accordance with one or more aspects of the present disclosure. In some examples, the transmission scheme 300 may be implemented by wireless communications systems 100 and 200. For example, the transmission scheme 300 may be implemented by sidelink UEs 115 (a transmit UE 115 and a receive UE 115) as described with reference to FIGS. 1 and 2. The transmission scheme 300 depicts the transmission of sidelink reference signals 305 and DMRSs 315 from the transmit UE 115 to the receive UE 115 via multiple different transmit beams 325.

As described with reference to FIG. 2, the transmit UE 115 may transmit sidelink reference signals 305 to the receive UE 115 via time-frequency resources 310, where the transmit UE 115 and the receive UE 115 may use the sidelink reference signals 305 for a sidelink beam management procedure. For example, the transmit UE 115 may transmit sidelink reference signals 305-*a* via time-frequency resources 310-*a*, sidelink reference signals 305-*b* via time-frequency resources 310-*b*, and sidelink reference signals 305-*c* via time-frequency resources 310-*c*. In addition, the transmit UE 115 may transmit the sidelink reference signals 305 using different transmit beams 325. For example, the transmit UE 115 may transmit each set of sidelink reference signals 305 using a transmit beam 325-*a* (e.g., transmit beam 1), a transmit beam 325-*b* (e.g., transmit beam 2), a transmit beam 325-*c* (e.g., transmit beam 3), a transmit beam 325-*d* (e.g., transmit beam 4), or any combination thereof. The transmit UE 115 may transmit the sets of sidelink reference signals 305 semi-persistently, aperiodically, or according to a periodicity (periodically) based on a sidelink beam management configuration (e.g., which may be pre-configured for the UEs 115).

In addition to the sidelink reference signals 305, the transmit UE 115 may transmit sets of DMRSs 315 associated with a sidelink channel (e.g., PSSCH, PSCCH) via time-frequency resources 320 (e.g., second sets of time-frequency resources). For example, the transmit UE 115 may transmit DMRSs 315-*a* via time-frequency resources 320-*a* and DMRSs 315-*b* via time-frequency resources 320-*b*. In addition, the transmit UE 115 may transmit the DMRSs 315 using different transmit beams 325. The sidelink channel may include sidelink data, which the receive UE 115 may decode or demodulate in accordance with the DMRSs 315. In this way, the transmit UE 115 may repeat (e.g., transmit repetitions of) the sidelink data over multiple sidelink channels and DMRSs 315 using multiple transmit beams 220 to enable the sidelink beam management procedure.

In the example of FIG. 3, the time-frequency resources 310 used for transmitting the sidelink reference signals 305 and the time-frequency resources 320 used for transmitting the DMRSs 315 may be non-overlapping. As such, the receive UE 115 may perform the sidelink beam management procedure using the sidelink reference signals 305, the DMRS 315, or both. A resource configuration associated with the time-frequency resources 310 and the time-frequency resources 320 is described herein with reference to FIG. 4.

In some cases, the receive UE 115 may perform beam maintenance or beam training using the sidelink reference signals 305 or the DMRS 315. Additionally, or alternatively, the receive UE 115 may observe both the sidelink reference signals 305 and the sidelink channels associated with the DMRSs 315 that may override (e.g., blank-out, puncture, drop, etc.) the sidelink reference signals 305 over time. In some examples, the receive UE 115 may measure the transmit beams 325 (e.g., candidate transmit beams) over multiple reference signals or multiple sidelink channels for the sidelink beam management procedure. For example, the receive UE 115 may measure some transmit beams 325 based on the sidelink reference signals 305 for sidelink beam management and some other transmit beams 325 based on the sidelink channels and DMRSs 315.

In some examples, the receive UE 115 may perform different measurements or other processes as part of the sidelink beam management procedure. For example, the receive UE 115 may measure an RSRP of the transmit beams 325 using the sidelink reference signals 305, the DMRSs 315, or both and report the RSRP measurements to the transmit UE 115. That is, the receive UE 115 may perform a received power measurement procedure for the sidelink reference signals 305, the DMRSs 315, or a combination thereof, and the receive UE 115 may transmit a sidelink message to the transmit UE that indicates one or more RSRP measurements (as beam management information) associated with the received power measurement procedure.

Additionally, or alternatively, the receive UE 115 may monitor sidelink channels for the DMRSs 315, perform a decoding procedure, and select a transmit beam 325 associated with a sidelink channel for communications with the transmit UE 115. The receive UE 115 may transmit feedback (e.g., a HARQ-ACK message) to the transmit UE 115 using a PSFCH resource associated with the sidelink channel. In this way, the receive UE 115 may include feedback for the sidelink reference signals 305, the DMRSs 315, or both in the sidelink message.

In some examples, the receive UE 115 may initiate or perform a BFR procedure based on the sidelink reference signals 305, the DMRSs 315, or both. For example, the receive UE 115 may measure an RSRP of candidate or current transmit beams using the sidelink reference signals 305, the DMRSs 315, or both, and determine whether beam failure is triggered based on a comparison between the measured RSRPs and one or more RSRP thresholds. Put another way, the receive UE 115 may perform a received power measurement procedure for the sidelink reference signals 305, the DMRSs 315, or both and initiate a BFR procedure based on a beam failure that is triggered based on the one or more reference signal measurements and a measurement threshold. In such cases, the feedback included in the sidelink message may indicate time-frequency resources 310, time-frequency resources 320, or both associated with a reference signal measurement (a sidelink reference signal measurement or a DMRS measurement) that exceeds the measurement threshold (e.g., an RSRP threshold).

Additionally, or alternatively, the receive UE 115 may monitor a decoding result of one or more sidelink channels, count decoding failures, and determine whether beam failure is triggered based on the measured decoding failures and one or more error thresholds. That is, the receive UE 115 may decode one or more sidelink channels (e.g., PSSCHs, PSCCHs) associated with the DMRSs 315, and the receive UE 115 may initiate a BFR procedure based on a beam failure that is triggered based on the decoding of the sidelink channels and an error threshold. In this way, the receive UE 115 may perform a sidelink beam management procedure, which may include initial beam pairing, initial beam search, beam maintenance and training, beam measurements, beam prediction, BFR, and the like, based on the sidelink reference signals 305, the DMRSs 315, or both given that the time-frequency resources 310 and the time-frequency resources 320 are non-overlapping.

Figure 4:
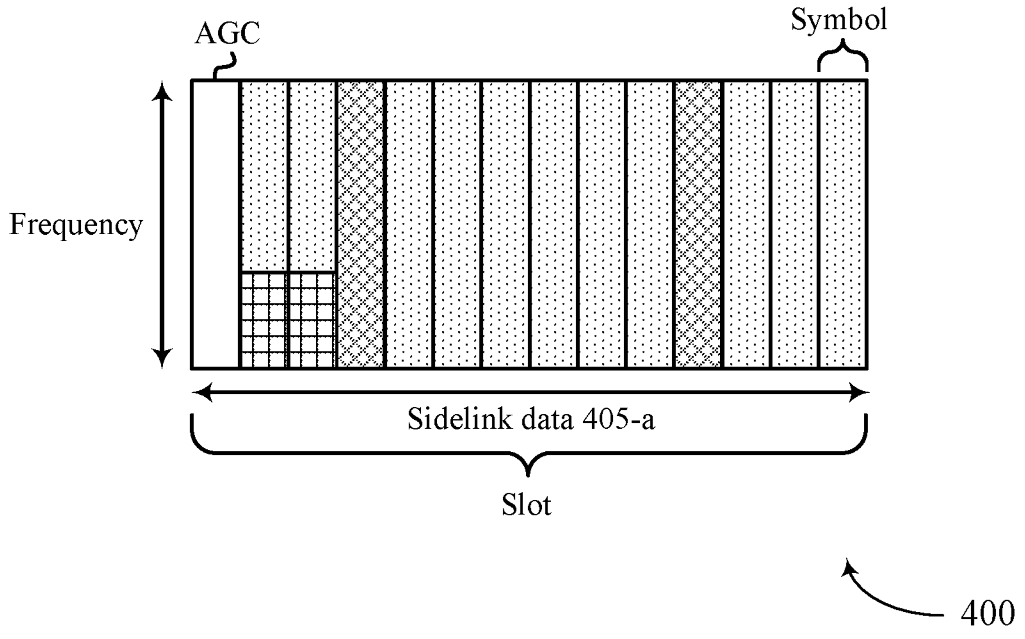
FIG. 4 shows examples of resource configurations that support sidelink beam management based on reference signal and sidelink channel transmissions in accordance with one or more aspects of the present disclosure.
Figure 4:
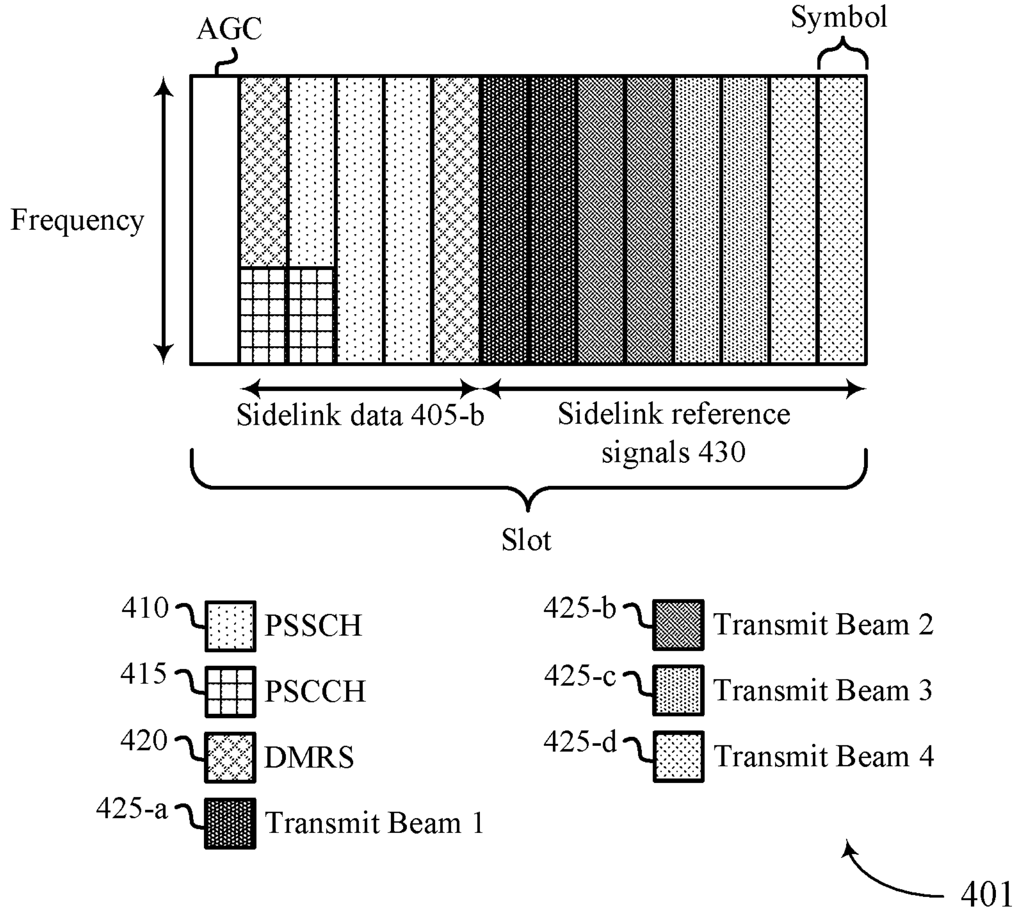

FIG. 4 shows an example of a resource configuration 400 that supports sidelink beam management based on reference signal and sidelink channel transmissions in accordance with one or more aspects of the present disclosure. In some examples, the resource configurations 400 and 401 may be implemented by wireless communications systems 100 and 200 and the transmission scheme 300. For example, the resource configurations 400 and 401 may be implemented by sidelink UEs 115 (a transmit UE 115 and a receive UE 115) as described with reference to FIGS. 1 and 2. The resource configurations 400 and 401 depict how sidelink reference signals 430 (configured for sidelink beam management) and sidelink channels (PSSCHs, PSCCHs) with DMRSs may be time-division multiplexed (TDMed) in a same slot.

The resource configuration 400 depicts a sidelink data transmission using a sidelink channel (PSSCH, PSCCH) via a slot when the transmit UE 115 refrains from transmitting sidelink reference signals 430 for sidelink beam management. In such cases, the transmit UE 115 may transmit sidelink data 405-*a* using a PSSCH 410 and a PSCCH 415 and DMRSs 420 associated with the PSSCH 410 and the PSCCH 415 over one or more transmit beams 425. The slot may include 14 symbols, one of which may be for automatic gain control (AGC). In addition, the slot may include symbols dedicated to the PSSCH 410, the PSCCH 415, and DMRSs 420. In some cases, each of the sidelink channels or DMRSs 420 may utilize a full frequency resource of the slot or part of the frequency resource.

As described herein with reference to FIG. 3, a transmit UE 115 may transmit sidelink reference signals 430 via a first set of time-frequency resources and DMRSs 420 associated with a sidelink channel (a PSSCH 410 and a PSCCH 415) via a second set of time-frequency resources, where the first set of time-frequency resources and the second set of time-frequency resources may be non-overlapping. In addition, the transmit UE 115 may transmit the sidelink reference signals 430 using different transmit beams 425, including a transmit beam 425-*a* (e.g., transmit beam 1), a transmit beam 425-*b* (e.g., transmit beam 2), a transmit beam 425-*c* (e.g., transmit beam 3), a transmit beam 425-*d* (e.g., transmit beam 4), or any combination thereof.

The resource configuration 401 depicts a sidelink data 405-*b* and sidelink reference signals 430 TDMed in a slot, where the sidelink data 405-*b* is transmitted with DMRSs 420 associated with a sidelink channel (a PSSCH 410 and a PSCCH 415) and the sidelink reference signals 430 are transmitted using the transmit beams 425. In some cases, one of the symbols (OFDM symbols) associated with each reference signal may be for AGC. In some examples, symbols used for transmitting the sidelink reference signals 430 may be located at the end of the slot. For example, the transmit UE 115 may transmit the sidelink reference signals 430 via the transmit beam 425-*a*, the transmit beam 425-*b*, the transmit beam 425-*c*, and the transmit beam 425-*d* in the last eight symbols of the slot (with two symbols dedicated to each transmit beam 425). In this way, the transmit UE 115 may utilize beam sweeping across the transmit beams 425 to transmit the sidelink reference signals 430. The transmit UE 115 may transmit the sidelink data 405-*b* using time-frequency resources that are non-overlapping with the time-frequency resources used to transmit the sidelink reference signals 430 for sidelink beam management.

Figure 5:
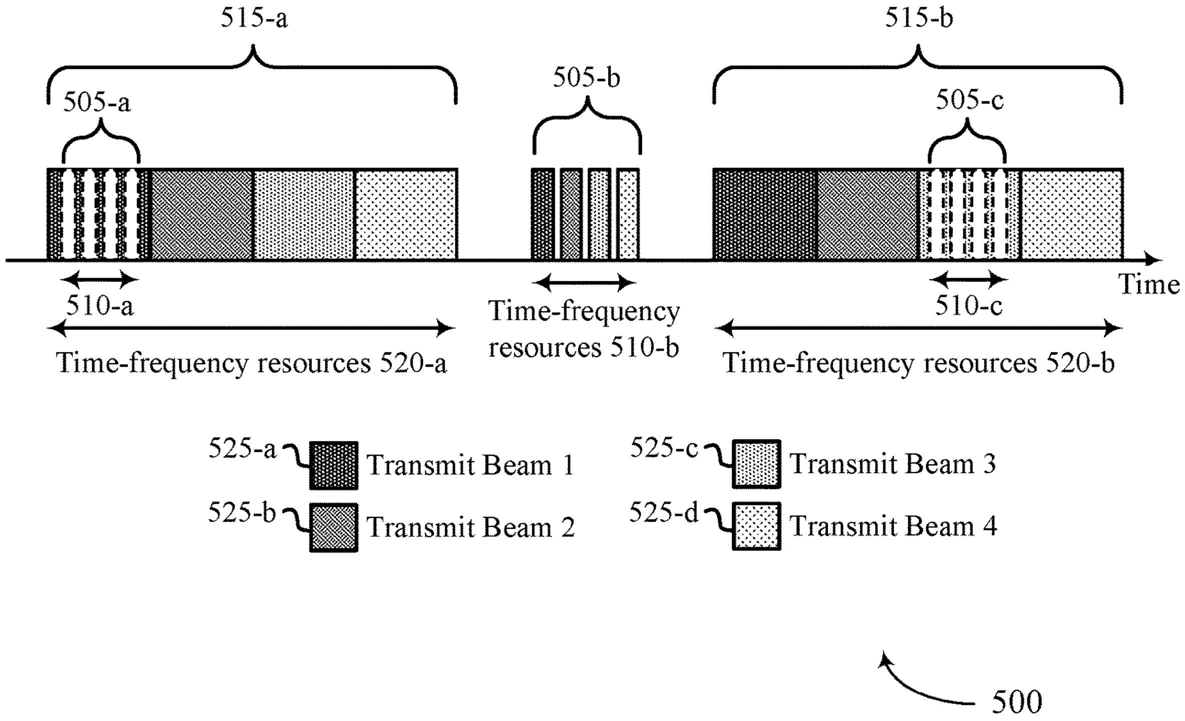
FIGS. 5 and 6 show examples of transmission schemes and resource configurations that support sidelink beam management based on reference signal and sidelink channel transmissions in accordance with one or more aspects of the present disclosure.
Figure 5:
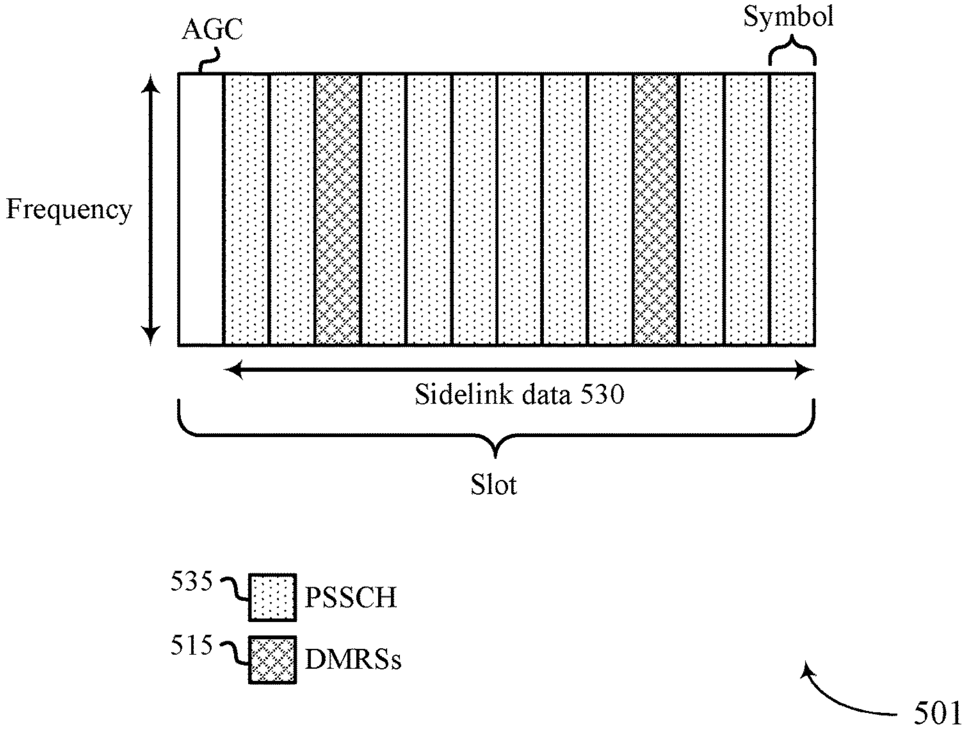

FIG. 5 shows an example of a transmission scheme 500 and a resource configuration 501 that supports sidelink beam management based on reference signal and sidelink channel transmissions in accordance with one or more aspects of the present disclosure. In some examples, the transmission scheme 500 and the resource configuration 501 may be implemented by wireless communications systems 100 and 200. For example, the transmission scheme 500 and the resource configuration 501 may be implemented by sidelink UEs 115 (a transmit UE 115 and a receive UE 115) as described with reference to FIGS. 1 and 2. The transmission scheme 500 depicts the transmission of sidelink reference signals 505 and DMRSs 515 via multiple different transmit beams 525. The resource configuration 501 depicts a sidelink data transmission using a sidelink channel via a slot.

As described with reference to FIG. 2, a transmit UE 115 may transmit sidelink reference signals 505 to a receive UE 115 via time-frequency resources 510, where the transmit UE 115 and the receive UE 115 may use the sidelink reference signals 505 for a sidelink beam management procedure. For example, the transmit UE 115 may transmit sidelink reference signals 505-*a* via time-frequency resources 510-*a*, sidelink reference signals 505-*b* via time-frequency resources 510-*b*, and sidelink reference signals 505-*c* via time-frequency resources 510-*c*. In addition, the transmit UE 115 may transmit the sidelink reference signals 505 using different transmit beams 525. For example, the transmit UE 115 may transmit each of the sidelink reference signals 505 (e.g., each set) using a transmit beam 525-*a* (e.g., transmit beam 1), a transmit beam 525-*b* (e.g., transmit beam 2), a transmit beam 525-*c* (e.g., transmit beam 5), a transmit beam 525-*d* (e.g., transmit beam 4), or any combination thereof. The transmit UE 115 may transmit the sidelink reference signals 505 semi-persistently, aperiodically, or according to a periodicity (periodically) based on a sidelink beam management configuration (e.g., which may be pre-configured for the UEs 115).

In addition to the sidelink reference signals 505, the transmit UE 115 may transmit DMRSs 515 (e.g., sets of DMRSs) associated with a sidelink channel (e.g., PSSCH, PSCCH) via time-frequency resources 520 (e.g., second sets of time-frequency resources). For example, the transmit UE 115 may transmit DMRSs 515-*a* via time-frequency resources 520-*a* and DMRSs 515-*b* via time-frequency resources 520-*b*. In addition, the transmit UE 115 may transmit the DMRSs 515 using different transmit beams 525. The sidelink channel may include sidelink data, which the receive UE 115 may decode or demodulate in accordance with the DMRSs 515. In this way, the transmit UE 115 may repeat (e.g., transmit repetitions of) the sidelink data over multiple sidelink channels and DMRSs 515 using multiple transmit beams 525 to enable the sidelink beam management procedure.

In the example of the transmission scheme 500, some of the time-frequency resources 510 used for transmitting the sidelink reference signals 505 and some of the time-frequency resources 520 used for transmitting the DMRSs 515 may overlap. For example, the time-frequency resources 510-*a* may overlap with the time-frequency resources 520-*a* and the time-frequency resources 510-*c* may overlap with the time-frequency resources 520-*b*. In such cases, the time-frequency resources 510-*a* and the time-frequency resources 510-*c* the transmit UE 115 uses for transmitting the sidelink reference signals 505 may be overridden and replaced by the sidelink channel associated with the DMRSs 515-*a* and the DMRSs 515-*b* and the sidelink data. As such, the receive UE 115 may receive the DMRS 515-*a* via the time-frequency resources 520-*a* and the DMRSs 515-*b* via the time-frequency resources 520-*b* instead of using the transmit beams 525 for sidelink beam management. As the sidelink reference signals 505-*a* overlap with a slot of the time-frequency resources 520-*a*, the sidelink reference signals 505-*a* may be overridden by the sidelink channel and DMRSs 515, and the transmit UE 115 may drop the transmission of the sidelink reference signals 505-*a* (in favor or transmitting the sidelink reference signals 505-*b*, which may be non-overlapping with any sidelink data).

In some cases, the receive UE 115 may perform beam maintenance or beam training using the DMRS 515-*a* and the DMRSs 515-*b*. Additionally, or alternatively, the receive UE 115 may observe both the sidelink reference signals 505 and the sidelink channels associated with the DMRSs 515 that may override (e.g., blank-out, puncture, drop, etc.) the sidelink reference signals 505 over time as described herein. In some examples, the receive UE 115 may measure the transmit beams 525 (e.g., candidate transmit beams) over multiple reference signals or multiple sidelink channels for the sidelink beam management procedure. For example, the receive UE 115 may measure some transmit beams 525 based on the sidelink reference signals 505 for sidelink beam management (e.g., the transmit beam 525-*b* and the transmit beam 525-*d*) and some other transmit beams 525 based on the sidelink channels and DMRSs 515 (e.g., the transmit beam 525-*a* and the transmit beam 525-*c*).

In some examples, the receive UE 115 may perform different measurements or other processes as part of the sidelink beam management procedure. For example, the receive UE 115 may measure an RSRP of the transmit beams 525 using the sidelink reference signals 505, the DMRSs 515, or both and report the RSRP measurements to the transmit UE 115. That is, the receive UE 115 may perform a received power measurement procedure for the sidelink reference signals 505, the DMRSs 515, or a combination thereof, and the receive UE 115 may transmit a sidelink message to the transmit UE that indicates one or more RSRP measurements (as beam management information) associated with the received power measurement procedure.

Additionally, or alternatively, the receive UE 115 may monitor sidelink channels for the DMRSs 515, perform a decoding procedure, and select a transmit beam 525 associated with a sidelink channel for communications with the transmit UE 115. The receive UE 115 may transmit feedback (e.g., a HARQ-ACK message) to the transmit UE 115 using a PSFCH resource associated with the sidelink channel. In this way, the receive UE 115 may include feedback for the sidelink reference signals 505, the DMRSs 515, or both in the sidelink message.

In some examples, the receive UE 115 may initiate or perform a BFR procedure based on the sidelink reference signals 505, the DMRSs 515, or both. For example, the receive UE 115 may measure an RSRP of candidate or current transmit beams using the sidelink reference signals 505, the DMRSs 515, or both, and determine whether beam failure is triggered based on a comparison between the measured RSRPs and one or more RSRP thresholds. Put another way, the receive UE 115 may perform a received power measurement procedure for the sidelink reference signals 505, the DMRSs 515, or both and initiate a BFR procedure based on a beam failure that is triggered based on the one or more reference signal measurements and a measurement threshold. In such cases, the feedback included in the sidelink message may indicate time-frequency resources 510, time-frequency resources 520, or both associated with a reference signal measurement (a sidelink reference signal measurement or a DMRS measurement) that exceeds the measurement threshold (e.g., an RSRP threshold).

Additionally, or alternatively, the receive UE 115 may monitor a decoding result of one or more sidelink channels, count decoding failures, and determine whether beam failure is triggered based on the measured decoding failures and one or more error thresholds. That is, the receive UE 115 may decode one or more sidelink channels (e.g., PSSCHs, PSCCHs) associated with the DMRSs 515, and the receive UE 115 may initiate a BFR procedure based on a beam failure that is triggered based on the decoding of the sidelink channels and an error threshold. In this way, the receive UE 115 may perform a sidelink beam management procedure, which may include initial beam pairing, initial beam search, beam maintenance and training, beam measurements, beam prediction, BFR, and the like, based on the sidelink reference signals 505, the DMRSs 515, or both given that the time-frequency resources 510 and the time-frequency resources 520 are non-overlapping.

The resource configuration 501 depicts a sidelink data transmission using a sidelink channel (PSSCH, PSCCH) via a slot when the time-frequency resources 510 and the time-frequency resources 520 at least partially overlap (as described herein with reference to FIG. 5 and the transmission scheme 500). In such cases, sidelink reference signals 505 for sidelink beam management and sidelink data 530 associated with a sidelink channel (e.g., a PSSCH 535) and DMRSs 515 may be TDMed in a slot based on the time-frequency resources 520 overriding or replacing the time-frequency resources 510. The transmit UE 115 may transmit sidelink data 530 via the PSSCH 535 and the DMRSs 515 associated with the PSSCH 535 over one or more transmit beams 525. For example, the slot may include 14 symbols, one of which may be for AGC. In addition, the slot may include two symbols for the DMRSs 515 and the transmit UE 115 may use the remaining symbols for transmitting the sidelink data 530 via the PSSCH 535. In some cases, the PSSCH 535 and the DMRSs 515 may utilize a full frequency resource of the slot or part of the frequency resource. Because the time-frequency resources 520 overlap with the time-frequency resources 510, transmission of the sidelink data 530 may override transmission of the sidelink reference signals 505. As such, the receive UE 115 may receive DMRSs 515 (e.g., one or more DMRSs) via a subset of the time-frequency resources 520 that overlap with the time-frequency resources 510.

Figure 6:
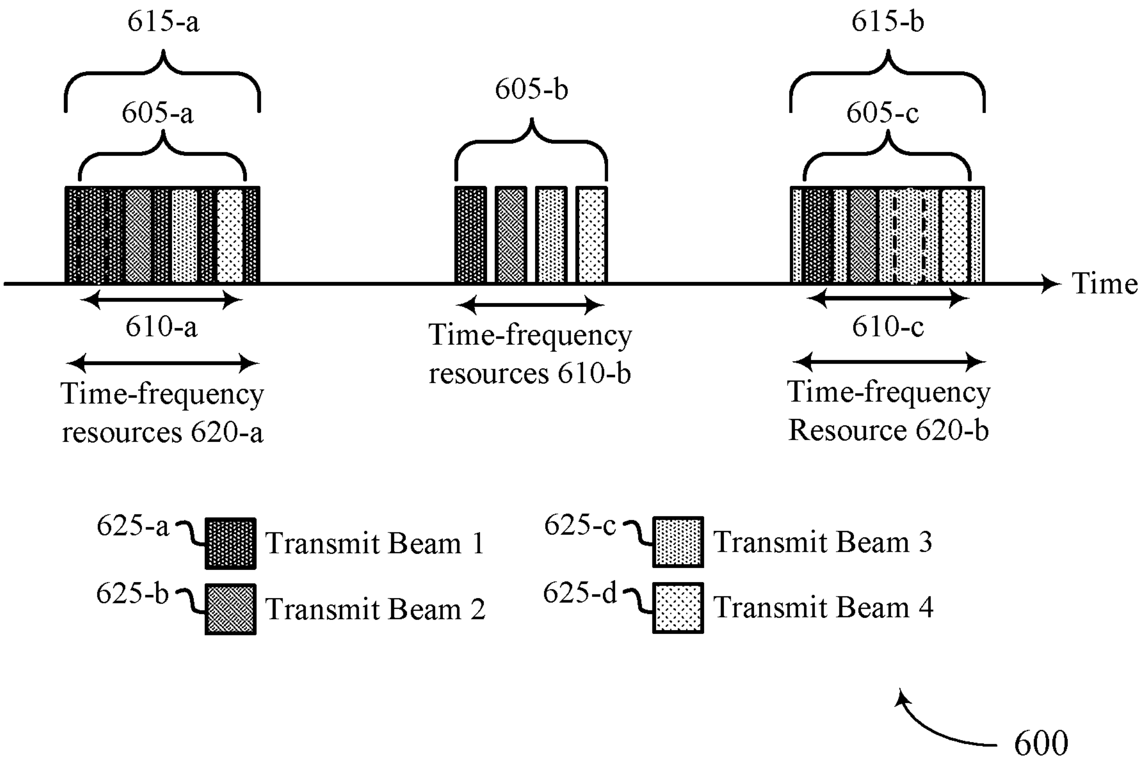
Figure 6:
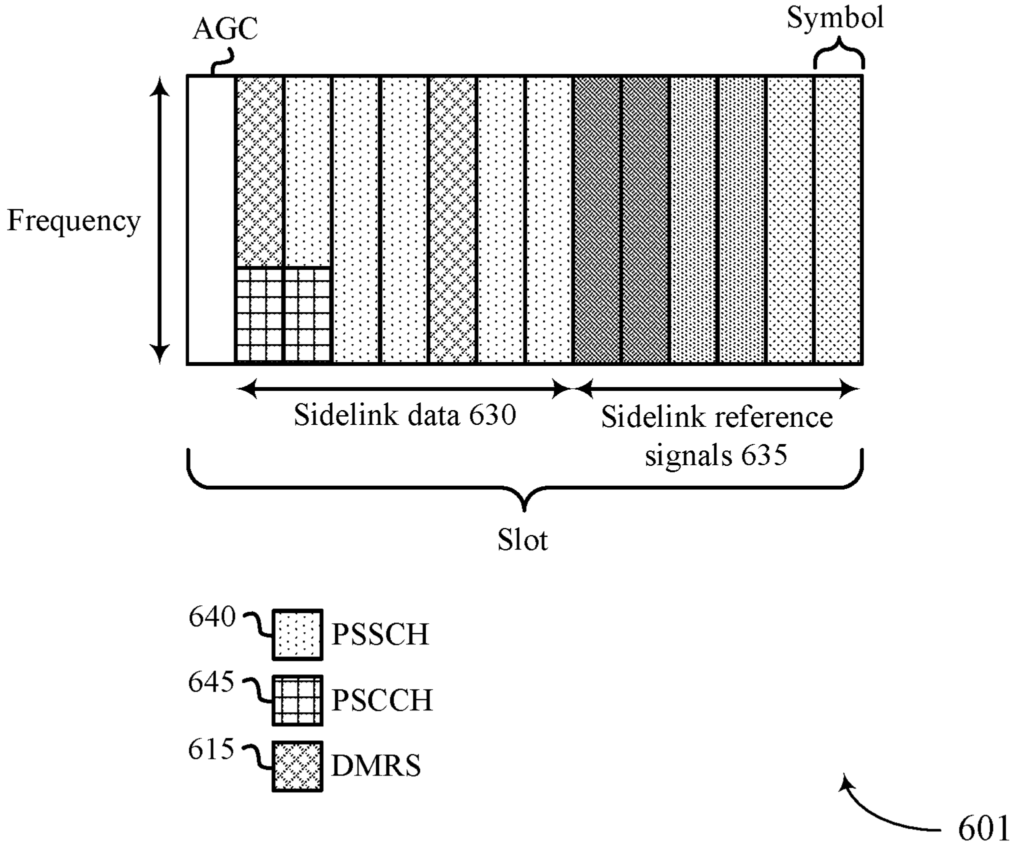

FIG. 6 shows an example of a transmission scheme 600 and a resource configuration 601 that supports sidelink beam management based on reference signal and sidelink channel transmissions in accordance with one or more aspects of the present disclosure. In some examples, the transmission scheme 600 and the resource configuration 601 may be implemented by wireless communications systems 100 and 200. For example, the transmission scheme 600 and the resource configuration 601 may be implemented by sidelink UEs 115 (a transmit UE 115 and a receive UE 115) as described with reference to FIGS. 1 and 2. The transmission scheme 600 depicts the transmission of sidelink reference signals 605 and DMRSs 615 via multiple different transmit beams 625. The resource configuration 601 depicts a sidelink data transmission using a sidelink channel via a slot.

As described with reference to FIG. 2, a transmit UE 115 may transmit sidelink reference signals 605 to a receive UE 115 via time-frequency resources 610, where the transmit UE 115 and the receive UE 115 may use the sidelink reference signals 605 for a sidelink beam management procedure. For example, the transmit UE 115 may transmit sidelink reference signals 605-*a* via time-frequency resources 610-*a*, sidelink reference signals 605-*b* via time-frequency resources 610-*b*, and sidelink reference signals 605-*c* via time-frequency resources 610-*c*. In addition, the transmit UE 115 may transmit the sidelink reference signals 605 using different transmit beams 625. For example, the transmit UE 115 may transmit each of the sidelink reference signals 605 (e.g., each set of sidelink reference signals) using a transmit beam 625-*a* (e.g., transmit beam 1), a transmit beam 625-*b* (e.g., transmit beam 2), a transmit beam 625-*c* (e.g., transmit beam 5), a transmit beam 625-*d* (e.g., transmit beam 4), or any combination thereof. The transmit UE 115 may transmit the sets of sidelink reference signals 605 semi-persistently, aperiodically, or according to a periodicity (periodically) based on a sidelink beam management configuration (e.g., which may be pre-configured for the UEs 115).

In addition to the sidelink reference signals 605, the transmit UE 115 may transmit DMRSs 615 associated with a sidelink channel (e.g., a PSSCH 640, a PSCCH 645) via time-frequency resources 620 (e.g., second sets of time-frequency resources). For example, the transmit UE 115 may transmit DMRSs 615-*a* via time-frequency resources 620-*a* and DMRSs 615-*b* via time-frequency resources 620-*b*. In addition, the transmit UE 115 may transmit the DMRSs 615 using different transmit beams 625. The sidelink channel may include sidelink data, which the receive UE 115 may decode or demodulate in accordance with the DMRSs 615. In this way, the transmit UE 115 may repeat (e.g., transmit repetitions of) the sidelink data over multiple sidelink channels and DMRSs 615 using multiple transmit beams 220 to enable the sidelink beam management procedure.

In the example of the transmission scheme 600, some of the time-frequency resources 610 used for transmitting the sidelink reference signals 605 and some of the time-frequency resources 620 used for transmitting the DMRSs 615 may overlap. For example, the time-frequency resources 610-*a* may overlap with the time-frequency resources 620-*a* and the time-frequency resources 610-*c* may overlap with the time-frequency resources 620-*b*. In such cases, the time-frequency resources 610-*a* and the time-frequency resources 610-*c* used for transmitting the sidelink reference signals 605 may be overridden and replaced by the sidelink channel associated with the DMRSs 615-*a* and the DMRSs 615-*b* and the sidelink data. As such, sidelink reference signals may be overridden or replaced by sidelink channels carrying the sidelink data if the sidelink reference signals and the sidelink channel are associated with a same transmit beam 625, such that other sidelink reference signals corresponding to different transmit beams 625 may still remain.

For example, the set of sidelink reference signals 605-*a* may correspond to the transmit beams 625-*a*, 625-*b*, 625-*c*, and 625-*d*, and the set of DMRSs 615-*a* may correspond to the transmit beam 625-*a*. As such, the time-frequency resources 610-*a* and the time-frequency resources 620-*a* only overlap for the transmit beam 625-*a*, and therefore, the transmit UE 115 may override a sidelink reference signal transmission over the transmit beam 625-*a* with sidelink data or a DMRS 615, however may maintain the transmission of the sidelink reference signals 605 over the transmit beams 625-*b*, 625-*c*, and 625-*d*. Additionally, or alternatively, the set of sidelink reference signals 605-*c* may correspond to the transmit beams 625-*a*, 625-*b*, 625-*c*, and 625-*d*, and the set of DMRSs 615-*b* may correspond to the transmit beam 625-*c*. As such, the time-frequency resources 610-*c* and the time-frequency resources 620-*b* only overlap for the transmit beam 625-*c*, and therefore, the transmit UE 115 may override a sidelink reference signal transmission over the transmit beam 625-*c* with sidelink data or a DMRS 615, however may maintain the transmission of the sidelink reference signals 605 over the transmit beams 625-*a*, 625-*b*, and 625-*d*.

In some cases, the receive UE 115 may perform beam maintenance or beam training using the non-replaced or non-overridden sidelink reference signals, the DMRSs 615, or a combination thereof. Additionally, or alternatively, the receive UE 115 may observe both the sidelink reference signals 605 and the sidelink channels associated with the DMRSs 615 that may override (e.g., blank-out, puncture, drop, etc.) the sidelink reference signals 605 over time as described herein. In some examples, the receive UE 115 may measure the transmit beams 625 (e.g., candidate transmit beams) over multiple reference signals or multiple sidelink channels for the sidelink beam management procedure. For example, the receive UE 115 may measure some transmit beams 625 based on the sidelink reference signals 605 for sidelink beam management (e.g., the transmit beam 625-*b* and the transmit beam 625-*d*) and some other transmit beams 625 based on the sidelink channels and DMRSs 615 (e.g., the transmit beam 625-*a* and the transmit beam 625-*c*).

In some examples, the receive UE 115 may perform different measurements or other processes as part of the sidelink beam management procedure. For example, the receive UE 115 may measure an RSRP of the transmit beams 625 using the sidelink reference signals 605, the DMRSs 615, or both and report the RSRP measurements to the transmit UE 115. That is, the receive UE 115 may perform a received power measurement procedure for the sidelink reference signals 605, the DMRSs 615, or a combination thereof, and the receive UE 115 may transmit a sidelink message to the transmit UE that indicates one or more RSRP measurements (as beam management information) associated with the received power measurement procedure.

Additionally, or alternatively, the receive UE 115 may monitor sidelink channels for the DMRSs 615, perform a decoding procedure, and select a transmit beam 625 associated with a sidelink channel for communications with the transmit UE 115. The receive UE 115 may transmit feedback (e.g., a HARQ-ACK message) to the transmit UE 115 using a PSFCH resource associated with the sidelink channel. In this way, the receive UE 115 may include feedback for the sidelink reference signals 605, the DMRSs 615, or both in the sidelink message.

In some examples, the receive UE 115 may initiate or perform a BFR procedure based on the sidelink reference signals 605, the DMRSs 615, or both. For example, the receive UE 115 may measure an RSRP of candidate or current transmit beams using the sidelink reference signals 605, the DMRSs 615, or both, and determine whether beam failure is triggered based on a comparison between the measured RSRPs and one or more RSRP thresholds. Put another way, the receive UE 115 may perform a received power measurement procedure for the sidelink reference signals 605, the DMRSs 615, or both and initiate a BFR procedure based on a beam failure that is triggered based on the one or more reference signal measurements and a measurement threshold. In such cases, the feedback included in the sidelink message may indicate time-frequency resources 610, time-frequency resources 620, or both associated with a reference signal measurement (a sidelink reference signal measurement or a DMRS measurement) that exceeds the measurement threshold (e.g., an RSRP threshold).

Additionally, or alternatively, the receive UE 115 may monitor a decoding result of one or more sidelink channels, count decoding failures, and determine whether beam failure is triggered based on the measured decoding failures and one or more error thresholds. That is, the receive UE 115 may decode one or more sidelink channels (e.g., PSSCHs, PSCCHs) associated with the DMRSs 615, and the receive UE 115 may initiate a BFR procedure based on a beam failure that is triggered based on the decoding of the sidelink channels and an error threshold. In this way, the receive UE 115 may perform a sidelink beam management procedure, which may include initial beam pairing, initial beam search, beam maintenance and training, beam measurements, beam prediction, BFR, and the like, based on the sidelink reference signals 605, the DMRSs 615, or both given that the time-frequency resources 610 and the time-frequency resources 620 are non-overlapping for the same transmit beam 625.

The resource configuration 601 depicts sidelink reference signals 635 and sidelink data 630 (PSSCHs 640, PSCCHs 645, and DMRSs 615) that are TDMed in a slot based on overriding a sidelink reference signal that is associated with a same transmit beam 625 as a DMRS 615 associated with the sidelink data 630 (as described herein with reference to FIG. 6 and the transmission scheme 600). The resource configuration 601 may depict a slot that corresponds to the time-frequency resources 620-*a*, in which a sidelink reference signal overlaps with sidelink data over the transmit beam 625-*a*.

In such cases, the slot may include 14 symbols (OFDM symbols), one of which may be for AGC. Symbols used for transmitting the sidelink reference signals 635 may be located at the end of the slot. For example, the transmit UE 115 may transmit the sidelink reference signals 635 via the transmit beam 625-*b*, the transmit beam 625-*c*, and the transmit beam 625-*d* in the last six symbols of the slot (with two symbols dedicated to each transmit beam 625). A sidelink reference signal transmission using the transmit beam 625-*a* may be excluded from the slot as the corresponding sidelink reference signal may be overridden by the sidelink channel carrying the sidelink data 630. In this way, the transmit UE 115 may utilize beam sweeping across the transmit beams 625 to transmit the sidelink reference signals 635. The transmit UE 115 may transmit the sidelink data 630 and the DMRSs 615 using time-frequency resources (PSSCH 640, PSCCH 645) that are non-overlapping with the time-frequency resources used to transmit the sidelink reference signals 635 for sidelink beam management.

Figure 7:
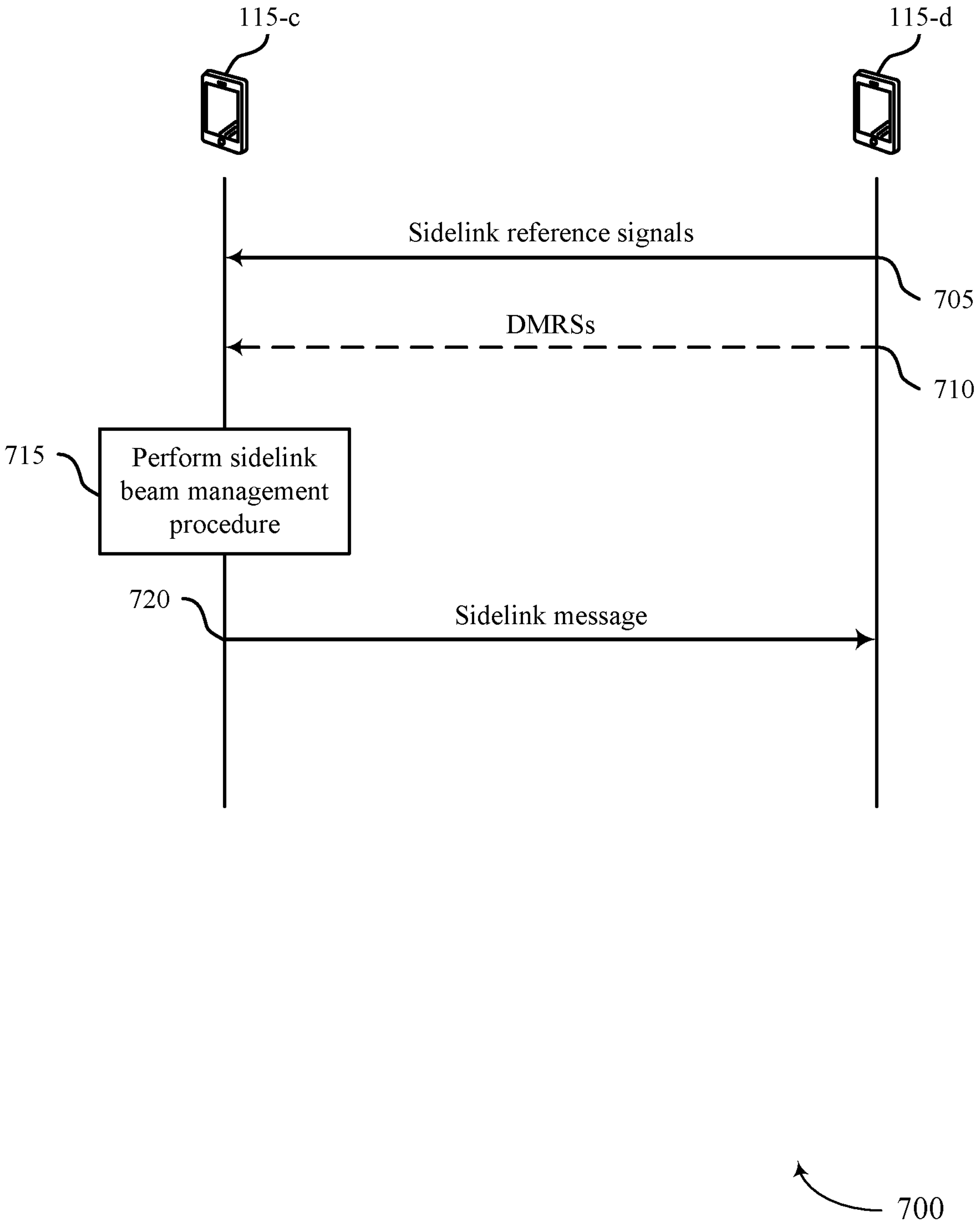
FIG. 7 shows an example of a process flows that supports sidelink beam management based on reference signal and sidelink channel transmissions in accordance with one or more aspects of the present disclosure.

FIG. 7 shows an example of a process flow 700 that supports sidelink beam management based on reference signal and sidelink channel transmissions in accordance with one or more aspects of the present disclosure. The process flow 700 may implement aspects of wireless communications systems 100 and 200, or may be implemented by aspects of the wireless communications system 100 and 200. For example, the process flow 700 may illustrate operations between a UE 115-*c* and a UE 115-*d*, which may be examples of corresponding devices described herein. In the following description of the process flow 700, the operations between the UE 115-*c* and the UE 115-*d* may be transmitted in a different order than the example order shown, or the operations performed by the UE 115-*c* and the UE 115-*d* may be performed in different orders or at different times. Some operations may also be omitted from the process flow 700, and other operations may be added to the process flow 700.

At 705, the UE 115-*c* may receive, from the UE 115-*d* and via a set of time-frequency resources associated with a sidelink beam management configuration, a set of multiple sidelink reference signals for a sidelink beam management procedure, the sidelink beam management procedure being between the UE 115-*c* and the UE 115-*d* in accordance with the sidelink beam management configuration. In some examples, the sidelink reference signals may be transmitted semi-persistently, periodically, or aperiodically. In addition, the sidelink reference signals may be transmitted using one or more transmit beams.

At 710, the UE 115-*c* may receive, from the UE 115-*d* via a second set of time-frequency resources, a set of multiple DMRSs associated with a sidelink channel, where the second set of time-frequency resources may be non-overlapping, partially-overlapping, or fully-overlapping with the set of time-frequency resources. If the sets of time-frequency resources are non-overlapping, the sidelink reference signals and the DMRSs may be TDMed in a slot such that the UE 115-*c* may receive both types of information. Alternatively, if the sets of time-frequency resources are at least partially overlapping, one or more time-frequency resources of the set of time-frequency resources corresponding to the sidelink reference signals may be replaced or overridden with a sidelink channel associated with the DMRSs. In some examples, the sidelink channel may be associated with a same transmit beam as the sidelink reference signal associated with the one or more time-frequency resources.

At 715, the UE 115-*c* may perform a sidelink beam management procedure using the set of multiple sidelink reference signals, the set of multiple DMRSs, or both. In some examples, whether the sidelink beam management procedure is based on the sidelink reference signals, DRMSs, or both may depend on whether or not the respective sets of time-frequency resources are overlapping. In some cases, the sidelink beam management procedure may include initial beam pairing, initial beam search, beam maintenance and training, beam measurements (e.g., RSRP measurements), beam prediction, BFR, and the like.

At 720, the UE 115-*c* may transmit, to the UE 115-*c* and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. In this way, the UE 115-*c* may measure or otherwise process the sidelink reference signals, the DMRSs, or both and report feedback to the UE 115-*d* to enable sidelink beam management.

Figure 8:
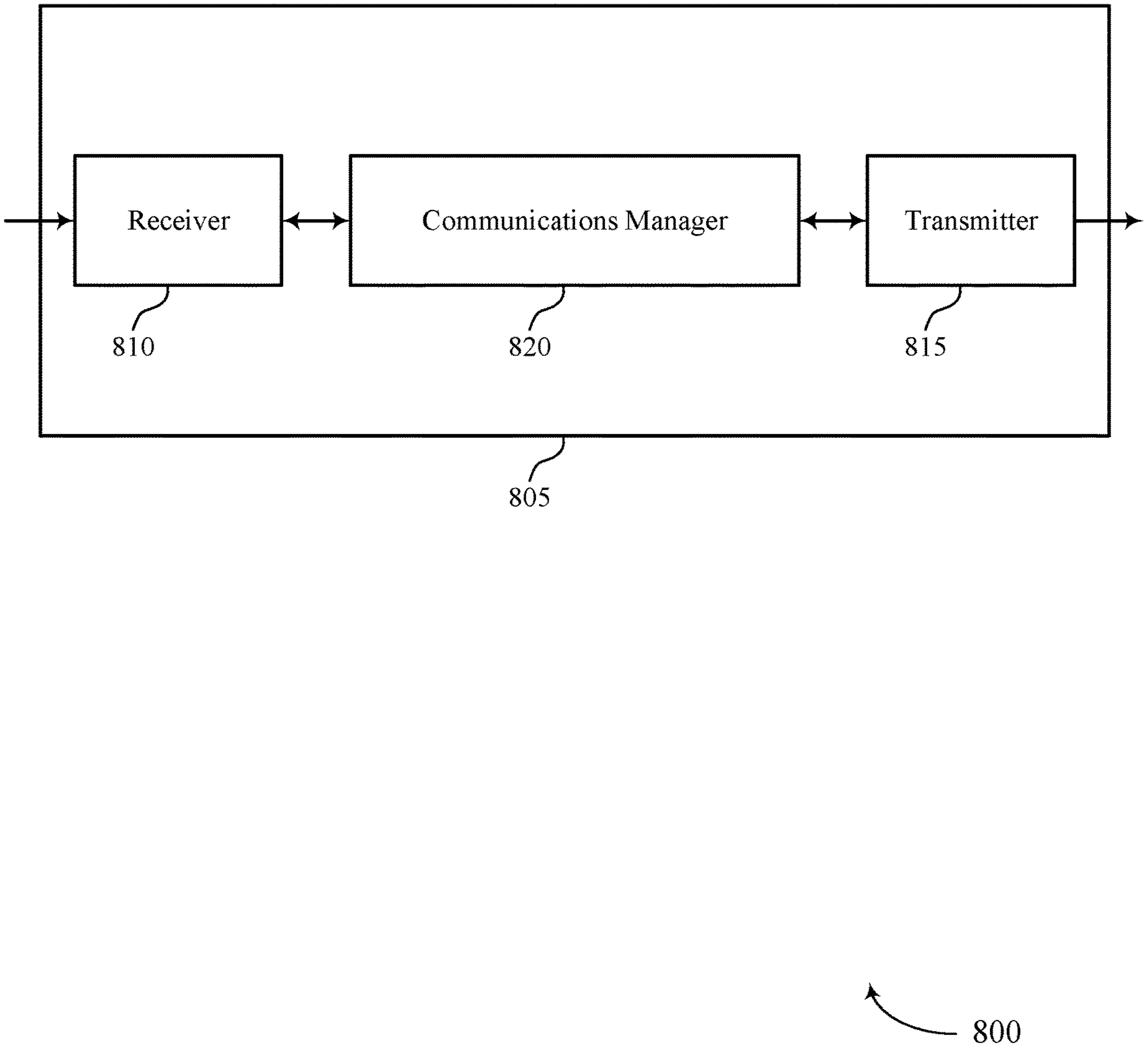
FIGS. 8 and 9 show block diagrams of devices that support sidelink beam management based on reference signal and sidelink channel transmissions in accordance with one or more aspects of the present disclosure.

FIG. 8 shows a block diagram 800 of a device 805 that supports sidelink beam management based on reference signal and sidelink channel transmissions in accordance with one or more aspects of the present disclosure. The device 805 may be an example of aspects of a receive UE as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink beam management based on reference signal and sidelink channel transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink beam management based on reference signal and sidelink channel transmissions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of sidelink beam management based on reference signal and sidelink channel transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by one or more processors, individually or collectively, executing instructions stored in the at least one memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first UE in accordance with examples as disclosed herein. For example, the communications manager 820 is capable of, configured to, or operable to support a means for receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The communications manager 820 is capable of, configured to, or operable to support a means for transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for sidelink beam management procedures, which may improve beam selection, beam measurement, and BFR between sidelink UEs. Thus, the techniques described herein may support improved communications between the sidelink UEs, reduced overhead, improved decoding success, and reduced beam failure.

Figure 9:
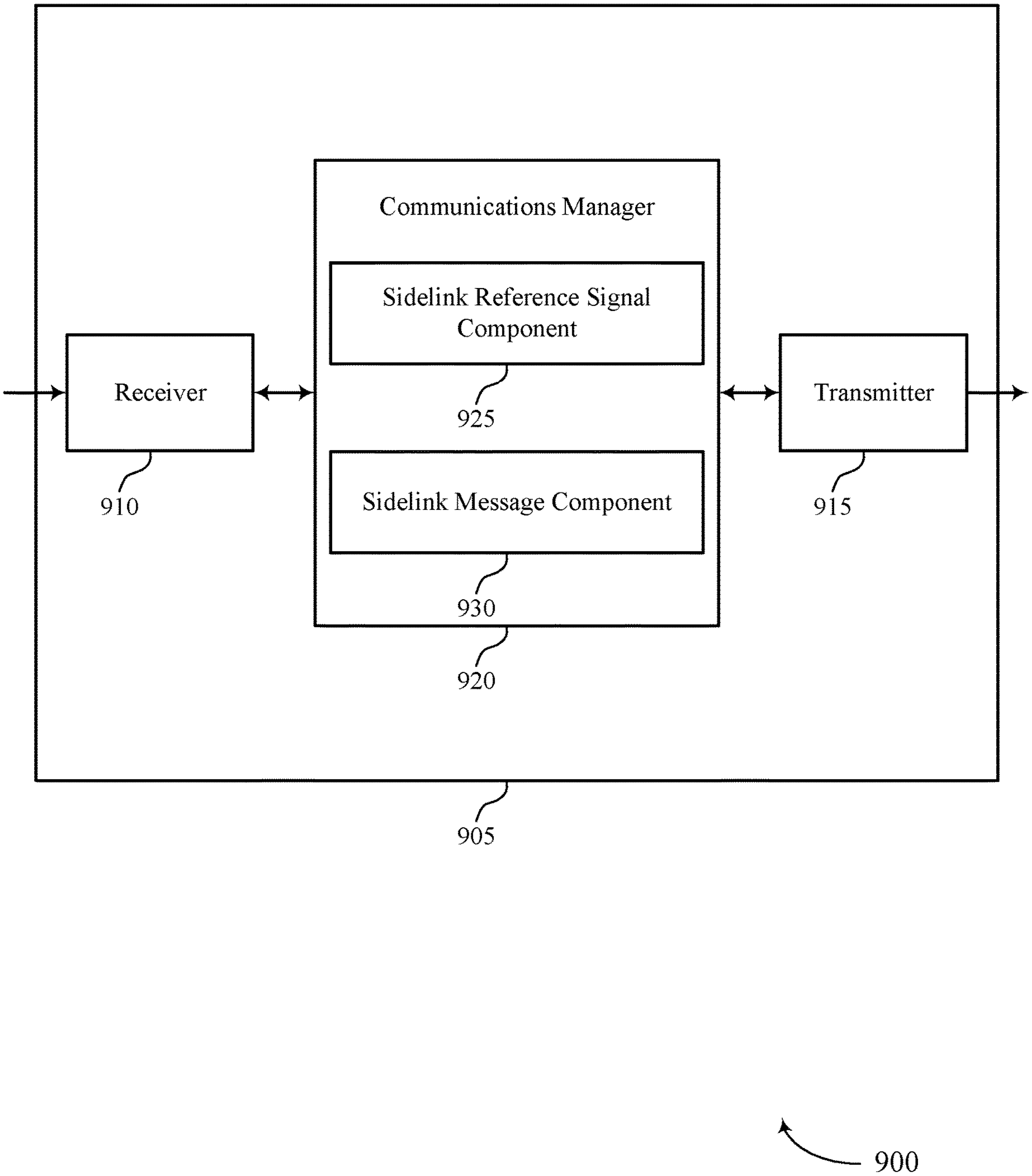

FIG. 9 shows a block diagram 900 of a device 905 that supports sidelink beam management based on reference signal and sidelink channel transmissions in accordance with one or more aspects of the present disclosure. The device 905 may be an example of aspects of a device 805 or a receive UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink beam management based on reference signal and sidelink channel transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink beam management based on reference signal and sidelink channel transmissions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of sidelink beam management based on reference signal and sidelink channel transmissions as described herein. For example, the communications manager 920 may include a sidelink reference signal component 925 a sidelink message component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first UE in accordance with examples as disclosed herein. The sidelink reference signal component 925 is capable of, configured to, or operable to support a means for receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The sidelink message component 930 is capable of, configured to, or operable to support a means for transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Figure 10:
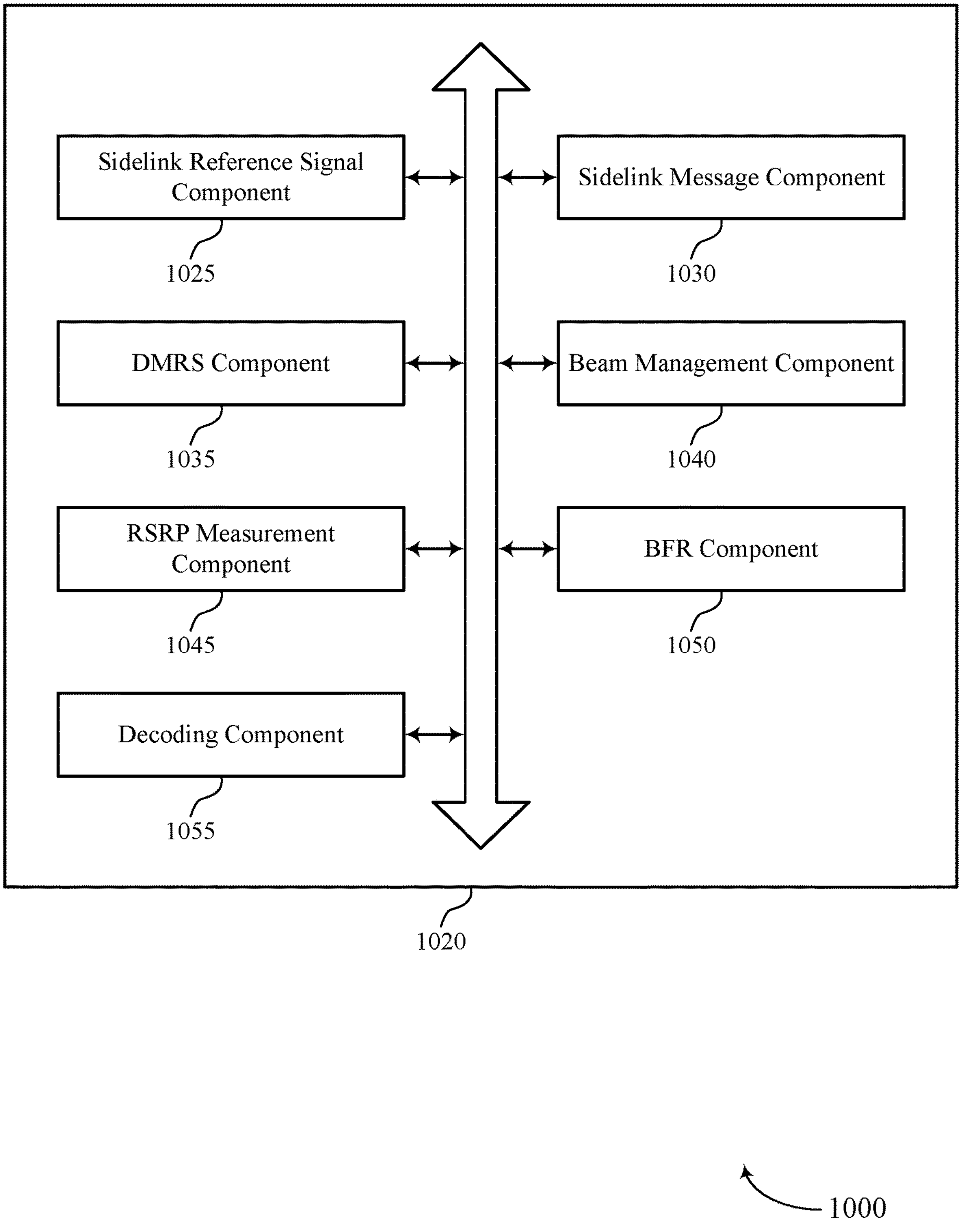
FIG. 10 shows a block diagram of a communications manager that supports sidelink beam management based on reference signal and sidelink channel transmissions in accordance with one or more aspects of the present disclosure.

FIG. 10 shows a block diagram 1000 of a communications manager 1020 that supports sidelink beam management based on reference signal and sidelink channel transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of sidelink beam management based on reference signal and sidelink channel transmissions as described herein. For example, the communications manager 1020 may include a sidelink reference signal component 1025, a sidelink message component 1030, a DMRS component 1035, a beam management component 1040, an RSRP measurement component 1045, an BFR component 1050, a decoding component 1055, or any combination thereof. Each of these components, or components or subcomponents thereof (e.g., one or more processors, one or more memories), may communicate, directly or indirectly, with one another (e.g., via one or more buses).

The communications manager 1020 may support wireless communications at a first UE in accordance with examples as disclosed herein. The sidelink reference signal component 1025 is capable of, configured to, or operable to support a means for receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The sidelink message component 1030 is capable of, configured to, or operable to support a means for transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

In some examples, the DMRS component 1035 is capable of, configured to, or operable to support a means for receiving, from the second UE via a second set of time-frequency resources, a set of multiple DMRSs associated with a sidelink channel, where the second set of time-frequency resources is non-overlapping with the set of time-frequency resources.

In some examples, the beam management component 1040 is capable of, configured to, or operable to support a means for performing the sidelink beam management procedure using the set of multiple sidelink reference signals, the set of multiple DMRSs, or both.

In some examples, the RSRP measurement component 1045 is capable of, configured to, or operable to support a means for performing a received power measurement procedure for the set of multiple sidelink reference signals, the set of multiple DMRSs, or a combination thereof, where the sidelink message indicates one or more received power measurements associated with the received power measurement procedure. In some examples, the feedback indicates resources associated with a reference signal measurement that exceeds a measurement threshold.

In some examples, the RSRP measurement component 1045 is capable of, configured to, or operable to support a means for performing a received power measurement procedure for the set of multiple sidelink reference signals, the set of multiple DMRSs, or a combination thereof. In some examples, the BFR component 1050 is capable of, configured to, or operable to support a means for initiating a BFR procedure based on a beam failure that is triggered based on one or more reference signal measurements and a measurement threshold.

In some examples, the decoding component 1055 is capable of, configured to, or operable to support a means for decoding a set of multiple sidelink channels associated with the set of multiple DMRSs. In some examples, the BFR component 1050 is capable of, configured to, or operable to support a means for initiating a BFR procedure based on a beam failure that is triggered based on the decoding of the set of multiple sidelink channels and an error threshold.

In some examples, the set of multiple sidelink reference signals and a set of multiple sidelink channels associated with the set of multiple DMRSs are TDMed in a slot.

In some examples, the DMRS component 1035 is capable of, configured to, or operable to support a means for receiving, from the second UE via a second set of time-frequency resources, a set of multiple DMRSs associated with a sidelink channel, where the second set of time-frequency resources at least partially overlaps the set of time-frequency resources.

In some examples, to support receiving the set of multiple DMRSs, the DMRS component 1035 is capable of, configured to, or operable to support a means for receiving one or more DMRSs of the set of multiple DMRSs via a subset of the second set of time-frequency resources, where the subset overlaps the set of time-frequency resources.

In some examples, a time-frequency resource of the set of time-frequency resources is replaced with the sidelink channel associated with the set of multiple DMRSs based on the sidelink channel being associated with a same transmit beam as a sidelink reference signal associated with the time-frequency resource.

In some examples, the set of multiple sidelink reference signals are received semi-persistently, aperiodically, or according to a periodicity based on the sidelink beam management configuration.

Figure 11:
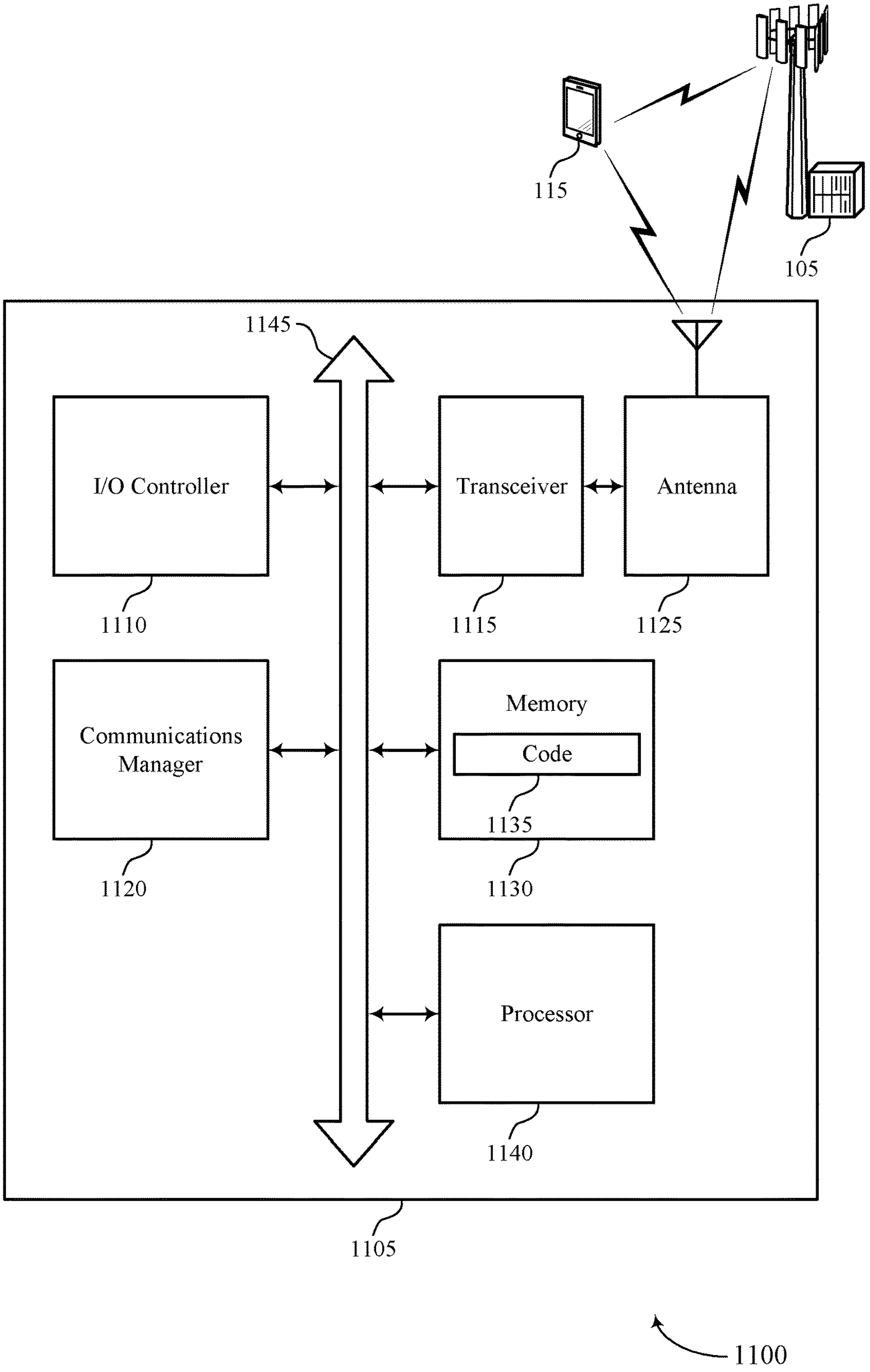
FIG. 11 shows a diagram of a system including a device that supports sidelink beam management based on reference signal and sidelink channel transmissions in accordance with one or more aspects of the present disclosure.

FIG. 11 shows a diagram of a system 1100 including a device 1105 that supports sidelink beam management based on reference signal and sidelink channel transmissions in accordance with one or more aspects of the present disclosure. The device 1105 may be an example of or include the components of a device 805, a device 905, or a receive UE as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof, which may be understood as one or more processors). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink beam management based on reference signal and sidelink channel transmissions). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a first UE in accordance with examples as disclosed herein. For example, the communications manager 1120 is capable of, configured to, or operable to support a means for receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The communications manager 1120 is capable of, configured to, or operable to support a means for transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

By including or configuring the communications manager 1120 in accordance with examples as described herein, the device 1105 may support techniques for sidelink beam management procedures, which may improve beam selection, beam measurement, and BFR between sidelink UEs. Thus, the techniques described herein may support improved communications between the sidelink UEs, reduced overhead, improved decoding success, reduced beam failure, and reduced processing.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of sidelink beam management based on reference signal and sidelink channel transmissions as described herein, or the processor 1140 and the memory 1130 may be otherwise configured to perform or support such operations.

Figure 12:
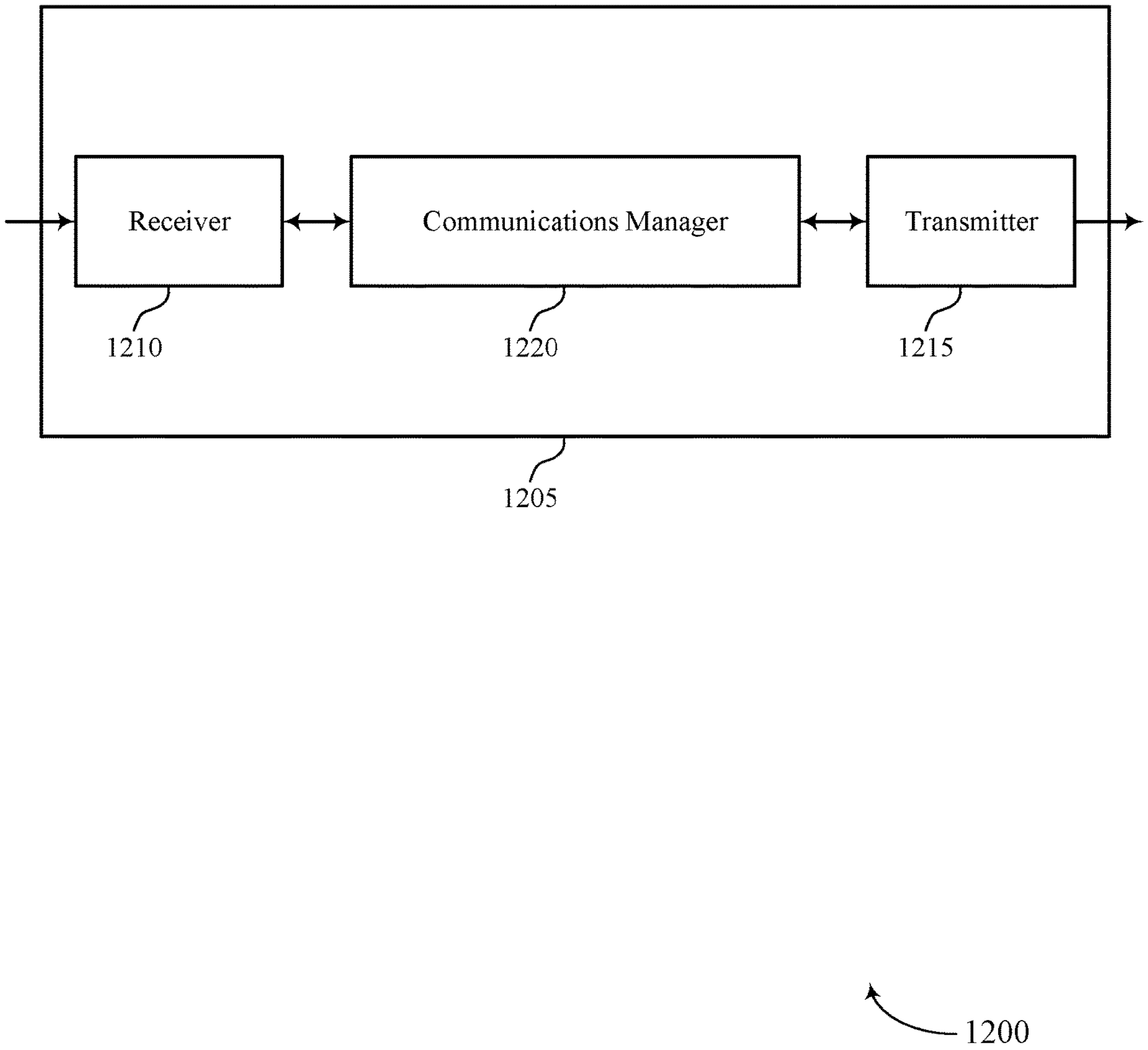
FIGS. 12 and 13 show block diagrams of devices that support sidelink beam management based on reference signal and sidelink channel transmissions in accordance with one or more aspects of the present disclosure.

FIG. 12 shows a block diagram 1200 of a device 1205 that supports sidelink beam management based on reference signal and sidelink channel transmissions in accordance with one or more aspects of the present disclosure. The device 1205 may be an example of aspects of a transmit UE as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of sidelink beam management based on reference signal and sidelink channel transmissions as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by one or more processors, individually or collectively, executing instructions stored in the at least one memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first UE in accordance with examples as disclosed herein. For example, the communications manager 1220 is capable of, configured to, or operable to support a means for transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The communications manager 1220 is capable of, configured to, or operable to support a means for receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for sidelink beam management procedures, which may improve beam selection, beam measurement, and BFR between sidelink UEs. Thus, the techniques described herein may support improved communications between the sidelink UEs, reduced overhead, improved decoding success, reduced beam failure, and reduced processing.

Figure 13:
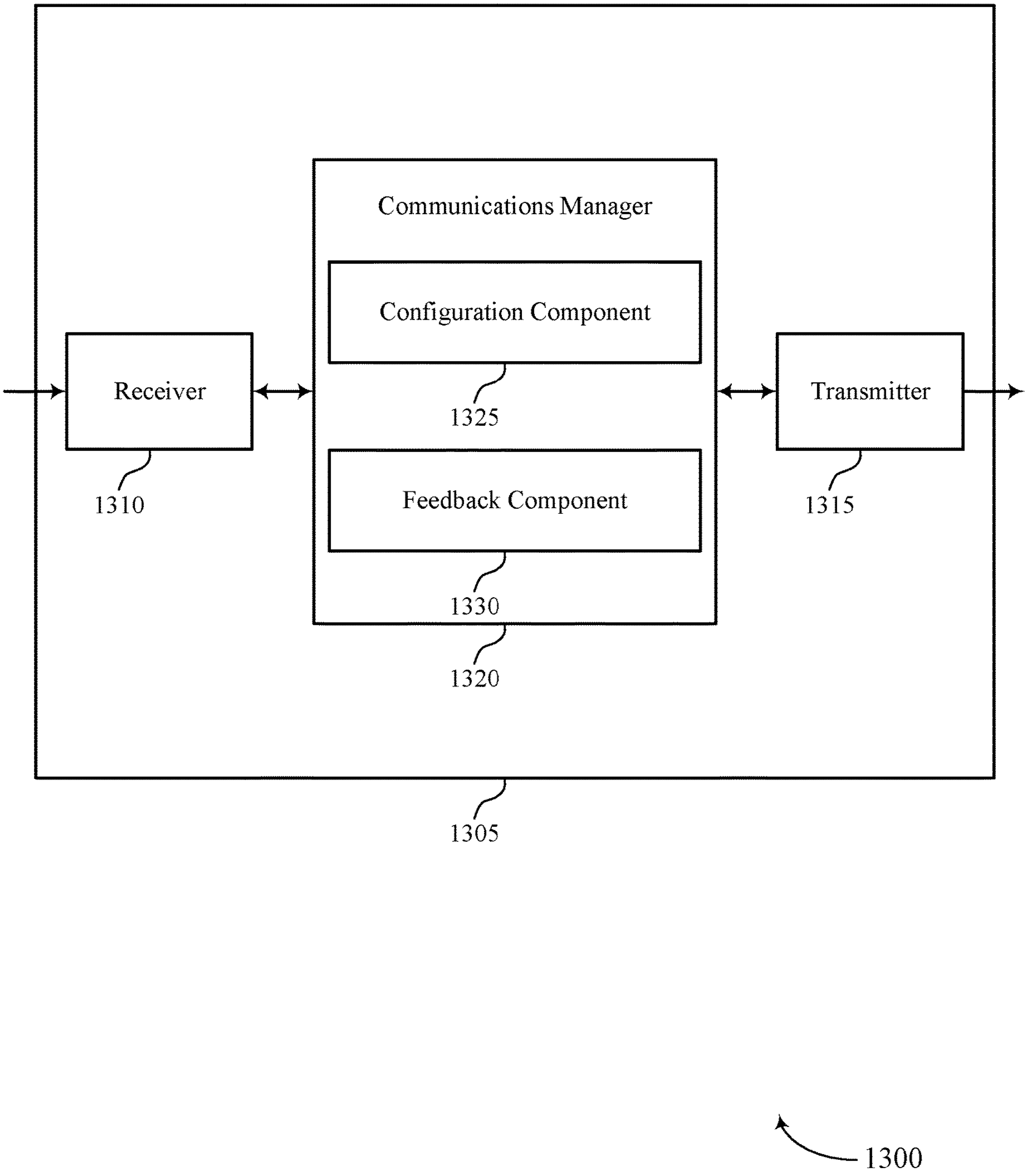

FIG. 13 shows a block diagram 1300 of a device 1305 that supports sidelink beam management based on reference signal and sidelink channel transmissions in accordance with one or more aspects of the present disclosure. The device 1305 may be an example of aspects of a device 1205 or a transmit UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of sidelink beam management based on reference signal and sidelink channel transmissions as described herein. For example, the communications manager 1320 may include a configuration component 1325 a feedback component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a first UE in accordance with examples as disclosed herein. The configuration component 1325 is capable of, configured to, or operable to support a means for transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The feedback component 1330 is capable of, configured to, or operable to support a means for receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

Figure 14:
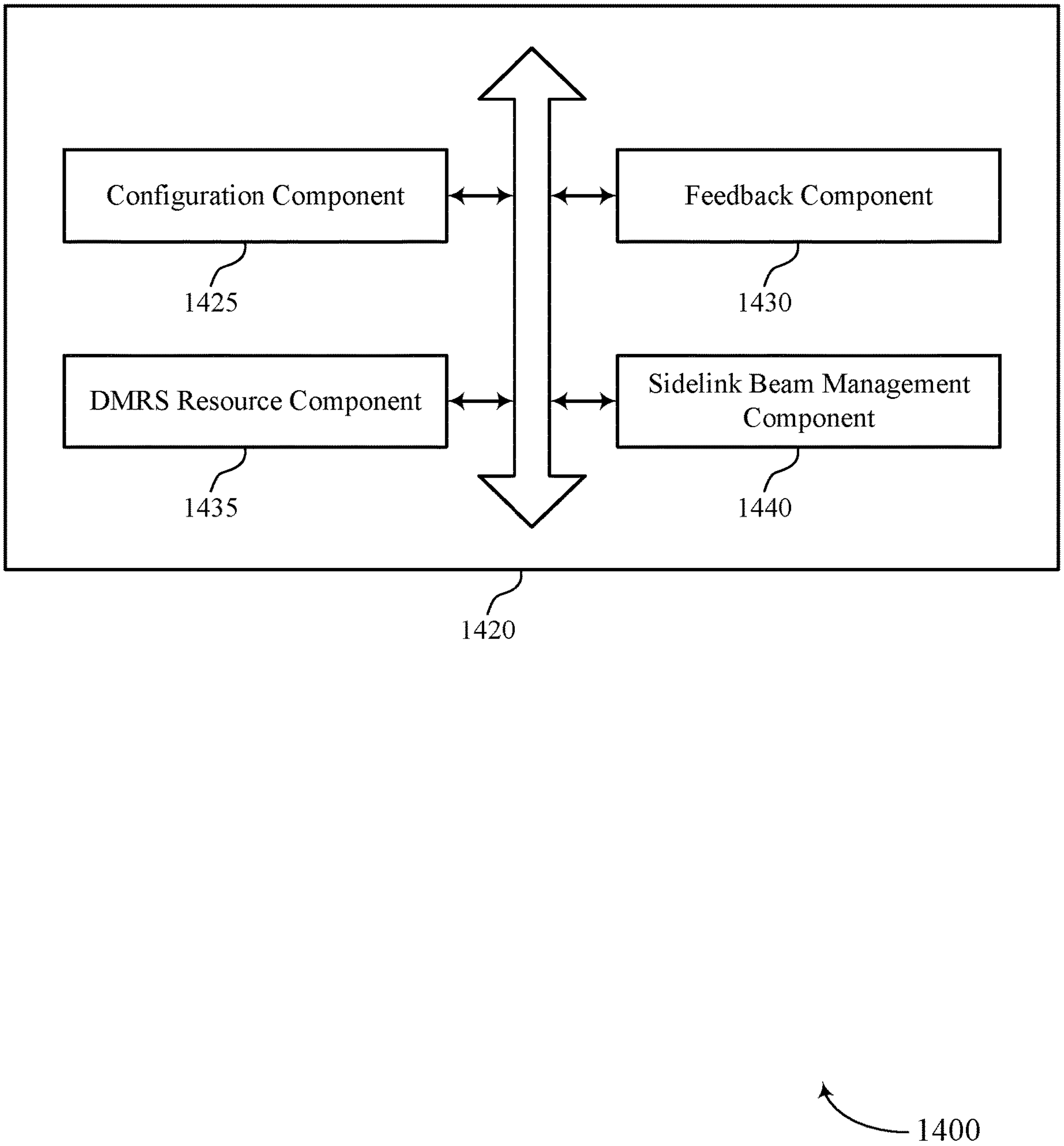
FIG. 14 shows a block diagram of a communications manager that supports sidelink beam management based on reference signal and sidelink channel transmissions in accordance with one or more aspects of the present disclosure.

FIG. 14 shows a block diagram 1400 of a communications manager 1420 that supports sidelink beam management based on reference signal and sidelink channel transmissions in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of sidelink beam management based on reference signal and sidelink channel transmissions as described herein. For example, the communications manager 1420 may include a configuration component 1425, a feedback component 1430, a DMRS resource component 1435, a sidelink beam management component 1440, or any combination thereof. Each of these components, or components or subcomponents thereof (e.g., one or more processors, one or more memories), may communicate, directly or indirectly, with one another (e.g., via one or more buses).

The communications manager 1420 may support wireless communications at a first UE in accordance with examples as disclosed herein. The configuration component 1425 is capable of, configured to, or operable to support a means for transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The feedback component 1430 is capable of, configured to, or operable to support a means for receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

In some examples, the DMRS resource component 1435 is capable of, configured to, or operable to support a means for transmitting, using the set of multiple transmit beams and via a second set of time-frequency resources, a set of multiple DMRSs associated with a sidelink channel, where the second set of time-frequency resources is non-overlapping with the set of time-frequency resources.

In some examples, the sidelink beam management procedure is based on the set of multiple sidelink reference signals, the set of multiple DMRSs, or both.

In some examples, the feedback indicates a set of multiple received power measurements associated with the set of multiple transmit beams based on the set of multiple sidelink reference signals, the set of multiple DMRSs, or both.

In some examples, the feedback indicates resources associated with at least one transmit beam of the set of multiple transmit beams based on the set of multiple sidelink reference signals, the set of multiple DMRSs, or both.

In some examples, the set of multiple sidelink reference signals and a set of multiple sidelink channels associated with the set of multiple DMRSs are TDMed in a slot.

In some examples, the DMRS resource component 1435 is capable of, configured to, or operable to support a means for transmitting, using the set of multiple transmit beams and via a second set of time-frequency resources, a set of multiple DMRSs associated with a sidelink channel, where the second set of time-frequency resources at least partially overlap the set of time-frequency resources.

In some examples, to support transmitting the set of multiple DMRSs, the DMRS resource component 1435 is capable of, configured to, or operable to support a means for transmitting one or more DMRSs of the set of multiple DMRSs via a subset of the second set of time-frequency resources, where the subset overlaps the set of time-frequency resources.

In some examples, a time-frequency resource of the set of time-frequency resources is replaced with the sidelink channel associated with the set of multiple DMRSs based on the sidelink channel being associated with a same transmit beam as a sidelink reference signal associated with the time-frequency resource.

In some examples, the set of multiple sidelink reference signals are transmitted semi-persistently, aperiodically, or according to a periodicity based on the sidelink beam management configuration.

Figure 15:
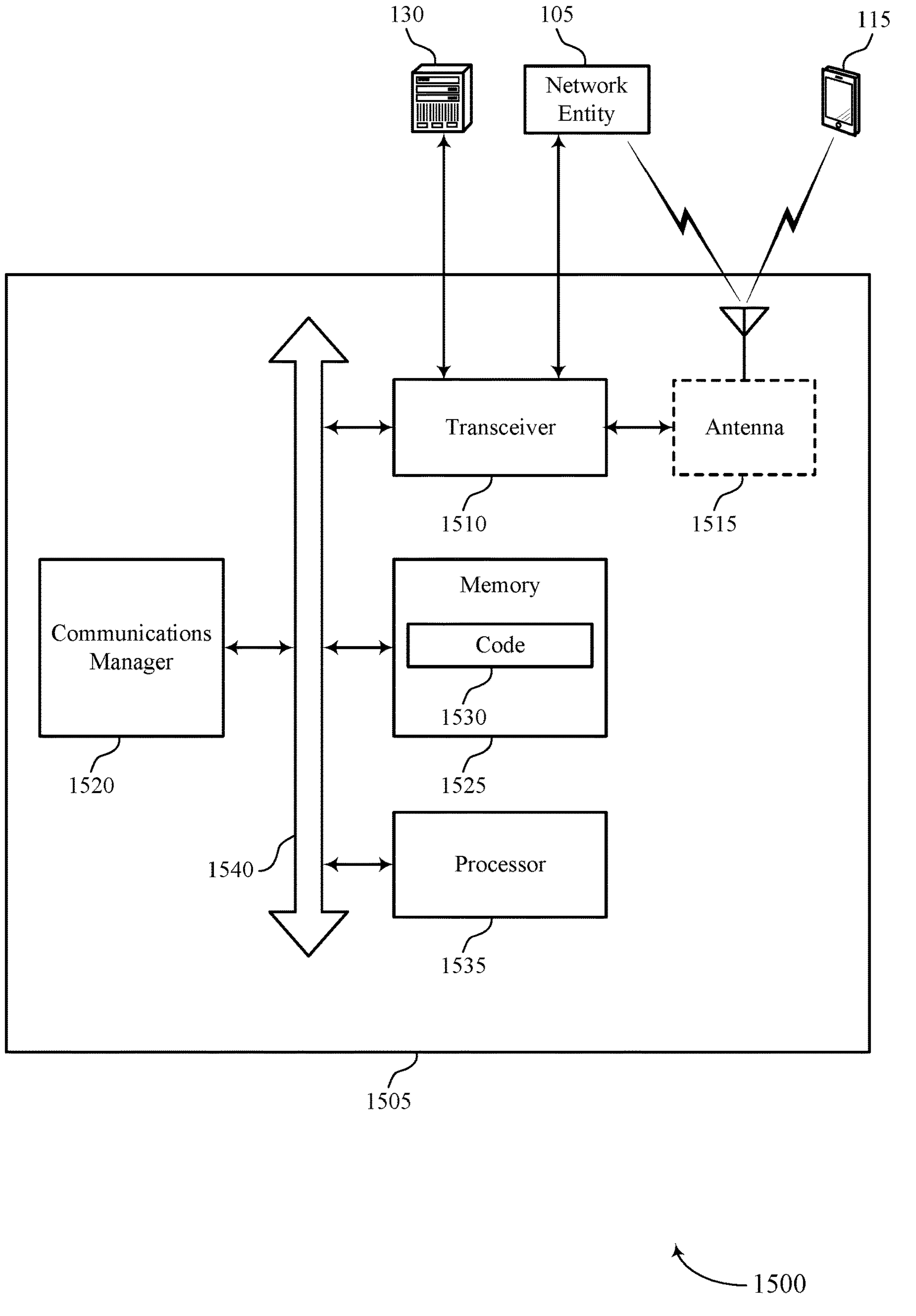
FIG. 15 shows a diagram of a system including a device that supports sidelink beam management based on reference signal and sidelink channel transmissions in accordance with one or more aspects of the present disclosure.

FIG. 15 shows a diagram of a system 1500 including a device 1505 that supports sidelink beam management based on reference signal and sidelink channel transmissions in accordance with one or more aspects of the present disclosure. The device 1505 may be an example of or include the components of a device 1205, a device 1305, or a transmit UE as described herein. The device 1505 may include components for bi-directional voice and data communications including components for transmitting and receiving communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM (such as one or more memories). The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting sidelink beam management based on reference signal and sidelink channel transmissions). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a first UE in accordance with examples as disclosed herein. For example, the communications manager 1520 is capable of, configured to, or operable to support a means for transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The communications manager 1520 is capable of, configured to, or operable to support a means for receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration.

By including or configuring the communications manager 1520 in accordance with examples as described herein, the device 1505 may support techniques for sidelink beam management procedures, which may improve beam selection, beam measurement, and BFR between sidelink UEs. Thus, the techniques described herein may support improved communications between the sidelink UEs, reduced overhead, improved decoding success, reduced beam failure, and reduced processing.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of sidelink beam management based on reference signal and sidelink channel transmissions as described herein, or the processor 1535 and the memory 1525 may be otherwise configured to perform or support such operations.

Figure 16:
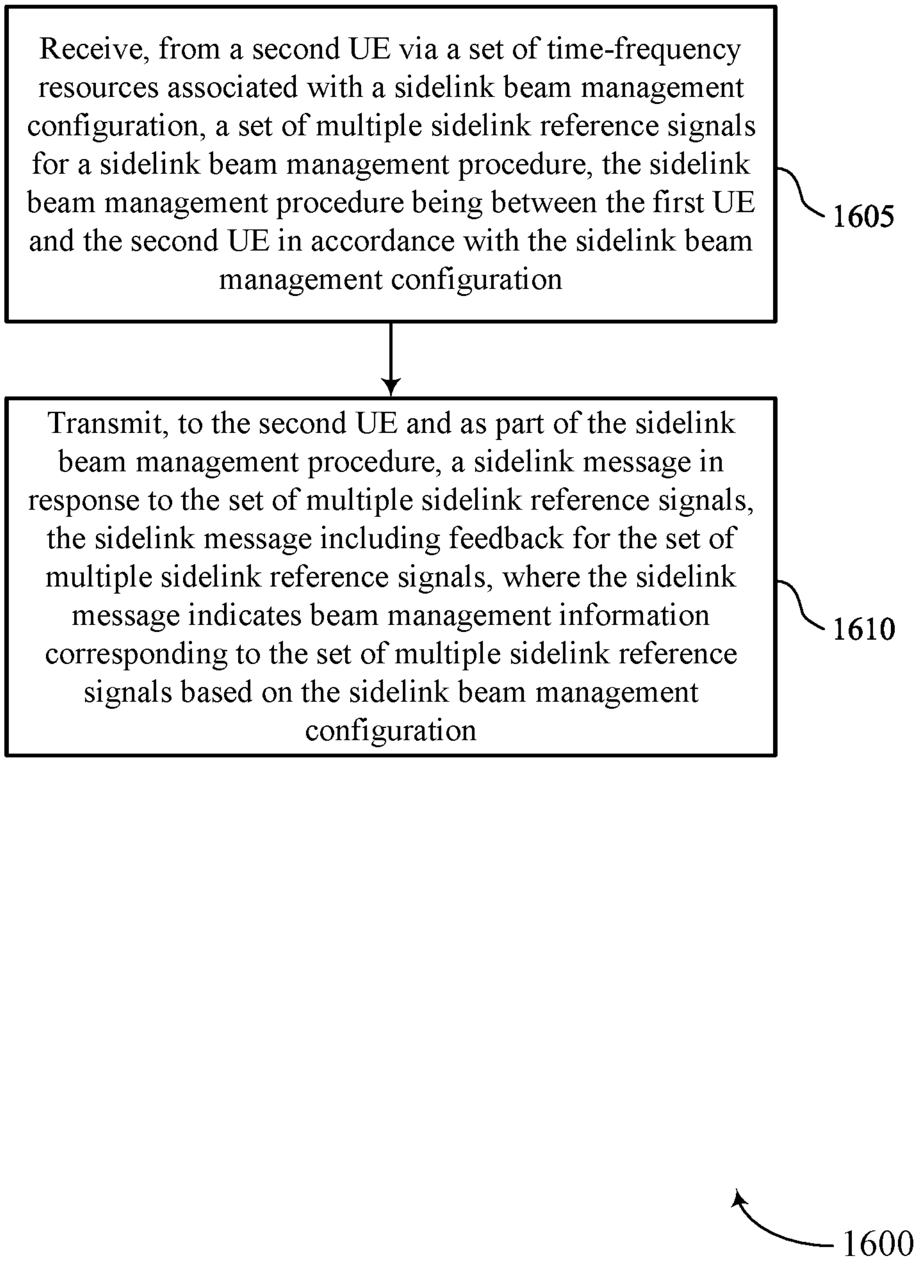

FIG. 16 shows a flowchart illustrating a method 1600 that supports sidelink beam management based on reference signal and sidelink channel transmissions in accordance with aspects of the present disclosure. The operations of the method 1600 may be implemented by a receive UE or its components as described herein. For example, the operations of the method 1600 may be performed by a receive UE as described with reference to FIGS. 1 through 11. In some examples, a receive UE may execute a set of instructions to control the functional elements of the wireless receive UE to perform the described functions. Additionally, or alternatively, the wireless receive UE may perform aspects of the described functions using special-purpose hardware.

At 1605, the method may include receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The operations of 1605 may be performed in accordance with examples as disclosed herein. In some examples, aspects of the operations of 1605 may be performed by a sidelink reference signal component 1025 as described with reference to FIG. 10.

At 1610, the method may include transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 1610 may be performed in accordance with examples as disclosed herein. In some examples, aspects of the operations of 1610 may be performed by a sidelink message component 1030 as described with reference to FIG. 10.

Figure 17:
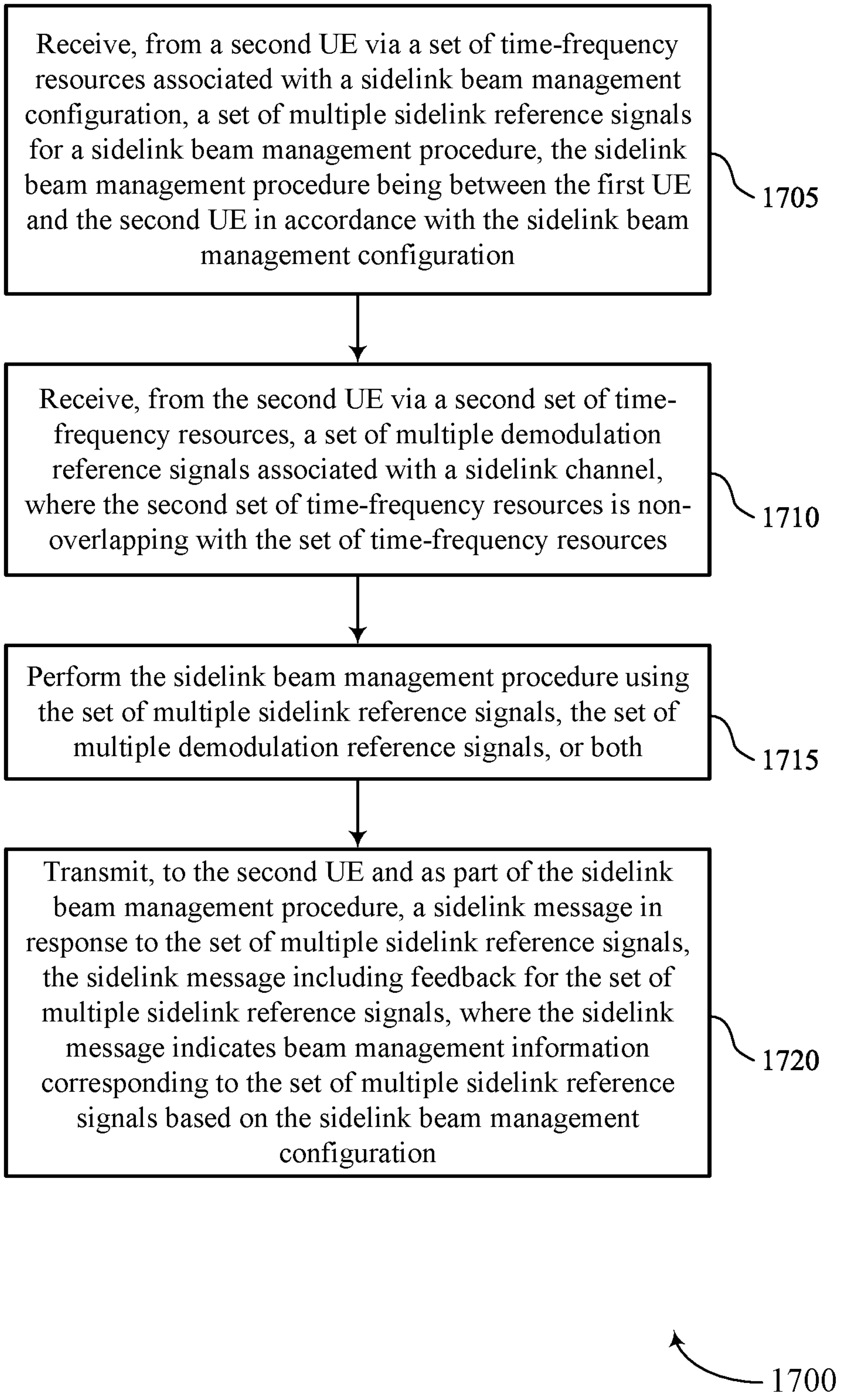

FIG. 17 shows a flowchart illustrating a method 1700 that supports sidelink beam management based on reference signal and sidelink channel transmissions in accordance with aspects of the present disclosure. The operations of the method 1700 may be implemented by a receive UE or its components as described herein. For example, the operations of the method 1700 may be performed by a receive UE as described with reference to FIGS. 1 through 11. In some examples, a receive UE may execute a set of instructions to control the functional elements of the wireless receive UE to perform the described functions. Additionally, or alternatively, the wireless receive UE may perform aspects of the described functions using special-purpose hardware.

At 1705, the method may include receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The operations of 1705 may be performed in accordance with examples as disclosed herein. In some examples, aspects of the operations of 1705 may be performed by a sidelink reference signal component 1025 as described with reference to FIG. 10.

At 1710, the method may include receiving, from the second UE via a second set of time-frequency resources, a set of multiple DMRSs associated with a sidelink channel, where the second set of time-frequency resources is non-overlapping with the set of time-frequency resources. The operations of 1710 may be performed in accordance with examples as disclosed herein. In some examples, aspects of the operations of 1710 may be performed by a DMRS component 1035 as described with reference to FIG. 10.

At 1715, the method may include performing the sidelink beam management procedure using the set of multiple sidelink reference signals, the set of multiple DMRSs, or both. The operations of 1715 may be performed in accordance with examples as disclosed herein. In some examples, aspects of the operations of 1715 may be performed by a beam management component 1040 as described with reference to FIG. 10.

At 1720, the method may include transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 1720 may be performed in accordance with examples as disclosed herein. In some examples, aspects of the operations of 1720 may be performed by a sidelink message component 1030 as described with reference to FIG. 10.

FIG. 18 shows a flowchart illustrating a method 1800 that supports sidelink beam management based on reference signal and sidelink channel transmissions in accordance with aspects of the present disclosure. The operations of the method 1800 may be implemented by a receive UE or its components as described herein. For example, the operations of the method 1800 may be performed by a receive UE as described with reference to FIGS. 1 through 11. In some examples, a receive UE may execute a set of instructions to control the functional elements of the wireless receive UE to perform the described functions. Additionally, or alternatively, the wireless receive UE may perform aspects of the described functions using special-purpose hardware.

At 1805, the method may include receiving, from a second UE via a set of time-frequency resources associated with a sidelink beam management configuration, a set of multiple sidelink reference signals for a sidelink beam management procedure, the sidelink beam management procedure being between the first UE and the second UE in accordance with the sidelink beam management configuration. The operations of 1805 may be performed in accordance with examples as disclosed herein. In some examples, aspects of the operations of 1805 may be performed by a sidelink reference signal component 1025 as described with reference to FIG. 10.

At 1810, the method may include receiving, from the second UE via a second set of time-frequency resources, a set of multiple DMRSs associated with a sidelink channel, where the second set of time-frequency resources at least partially overlaps the set of time-frequency resources. The operations of 1810 may be performed in accordance with examples as disclosed herein. In some examples, aspects of the operations of 1810 may be performed by a DMRS component 1035 as described with reference to FIG. 10.

At 1815, the method may include transmitting, to the second UE and as part of the sidelink beam management procedure, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 1815 may be performed in accordance with examples as disclosed herein. In some examples, aspects of the operations of 1815 may be performed by a sidelink message component 1030 as described with reference to FIG. 10.

FIG. 19 shows a flowchart illustrating a method 1900 that supports sidelink beam management based on reference signal and sidelink channel transmissions in accordance with aspects of the present disclosure. The operations of the method 1900 may be implemented by a transmit UE or its components as described herein. For example, the operations of the method 1900 may be performed by a transmit UE as described with reference to FIGS. 1 through 7 and 12 through 15. In some examples, a transmit UE may execute a set of instructions to control the functional elements of the wireless transmit UE to perform the described functions. Additionally, or alternatively, the wireless transmit UE may perform aspects of the described functions using special-purpose hardware.

At 1905, the method may include transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The operations of 1905 may be performed in accordance with examples as disclosed herein. In some examples, aspects of the operations of 1905 may be performed by a configuration component 1425 as described with reference to FIG. 14.

At 1910, the method may include receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 1910 may be performed in accordance with examples as disclosed herein. In some examples, aspects of the operations of 1910 may be performed by a feedback component 1430 as described with reference to FIG. 14.

FIG. 20 shows a flowchart illustrating a method 2000 that supports sidelink beam management based on reference signal and sidelink channel transmissions in accordance with aspects of the present disclosure. The operations of the method 2000 may be implemented by a transmit UE or its components as described herein. For example, the operations of the method 2000 may be performed by a transmit UE as described with reference to FIGS. 1 through 7 and 12 through 15. In some examples, a transmit UE may execute a set of instructions to control the functional elements of the wireless transmit UE to perform the described functions. Additionally, or alternatively, the wireless transmit UE may perform aspects of the described functions using special-purpose hardware.

At 2005, the method may include transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The operations of 2005 may be performed in accordance with examples as disclosed herein. In some examples, aspects of the operations of 2005 may be performed by a configuration component 1425 as described with reference to FIG. 14.

At 2010, the method may include transmitting, using the set of multiple transmit beams and via a second set of time-frequency resources, a set of multiple DMRSs associated with a sidelink channel, where the set of multiple sidelink reference signals and a set of multiple sidelink channels associated with the set of multiple DMRSs are TDMed in a slot. The operations of 2010 may be performed in accordance with examples as disclosed herein. In some examples, aspects of the operations of 2010 may be performed by a DMRS resource component 1435 as described with reference to FIG. 14.

At 2015, the method may include receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 2015 may be performed in accordance with examples as disclosed herein. In some examples, aspects of the operations of 2015 may be performed by a feedback component 1430 as described with reference to FIG. 14.

FIG. 21 shows a flowchart illustrating a method 2100 that supports sidelink beam management based on reference signal and sidelink channel transmissions in accordance with aspects of the present disclosure. The operations of the method 2100 may be implemented by a transmit UE or its components as described herein. For example, the operations of the method 2100 may be performed by a transmit UE as described with reference to FIGS. 1 through 7 and 12 through 15. In some examples, a transmit UE may execute a set of instructions to control the functional elements of the wireless transmit UE to perform the described functions. Additionally, or alternatively, the wireless transmit UE may perform aspects of the described functions using special-purpose hardware.

At 2105, the method may include transmitting, using a set of multiple transmit beams of the first UE and via a set of time-frequency resources associated with a sidelink beam management configuration of the first UE, a set of multiple sidelink reference signals for a sidelink beam management procedure, the sidelink beam management procedure being between the first UE and a second UE in accordance with the sidelink beam management configuration. The operations of 2105 may be performed in accordance with examples as disclosed herein. In some examples, aspects of the operations of 2105 may be performed by a configuration component 1425 as described with reference to FIG. 14.

At 2110, the method may include transmitting, using the set of multiple transmit beams and via a second set of time-frequency resources, one or more DMRSs of a set of multiple DMRSs associated with a sidelink channel via a subset of a second set of time-frequency resources, where the subset overlaps the set of time-frequency resources. The operations of 2110 may be performed in accordance with examples as disclosed herein. In some examples, aspects of the operations of 2110 may be performed by a DMRS resource component 1435 as described with reference to FIG. 14.

At 2115, the method may include transmitting one or more DMRSs of the set of multiple DMRSs via a subset of the second set of time-frequency resources, where the subset overlaps the set of time-frequency resources. The operations of 2115 may be performed in accordance with examples as disclosed herein. In some examples, aspects of the operations of 2115 may be performed by a DMRS resource component 1435 as described with reference to FIG. 14.

At 2120, the method may include receiving, from the second UE, a sidelink message in response to the set of multiple sidelink reference signals, the sidelink message including feedback for the set of multiple sidelink reference signals, where the sidelink message indicates beam management information corresponding to the set of multiple sidelink reference signals based on the sidelink beam management configuration. The operations of 2120 may be performed in accordance with examples as disclosed herein. In some examples, aspects of the operations of 2120 may be performed by a feedback component 1430 as described with reference to FIG. 14.

The following provides an overview of aspects of the present disclosure:

Aspect 1: A method for wireless communications at a first UE, comprising: receiving, from a second UE via a set of time-frequency resources associated with a sidelink beam management configuration, a plurality of sidelink reference signals for a sidelink beam management procedure, the sidelink beam management procedure being between the first UE and the second UE in accordance with the sidelink beam management configuration; and transmitting, to the second UE and as part of the sidelink beam management procedure, a sidelink message in response to the plurality of sidelink reference signals, the sidelink message comprising feedback for the plurality of sidelink reference signals, wherein the sidelink message indicates beam management information corresponding to the plurality of sidelink reference signals based at least in part on the sidelink beam management configuration.

Aspect 2: The method of aspect 1, further comprising: receiving, from the second UE via a second set of time-frequency resources, a plurality of DMRSs associated with a sidelink channel, wherein the second set of time-frequency resources is non-overlapping with the set of time-frequency resources.

Aspect 3: The method of aspect 2, further comprising: performing the sidelink beam management procedure using the plurality of sidelink reference signals, the plurality of DMRSs, or both.

Aspect 4: The method of any of aspects 2 through 3, further comprising: performing a received power measurement procedure for the plurality of sidelink reference signals, the plurality of DMRSs, or a combination thereof, wherein the sidelink message indicates one or more received power measurements associated with the received power measurement procedure.

Aspect 5: The method of any of aspects 2 through 4, wherein the feedback indicates resources associated with a reference signal measurement that exceeds a measurement threshold.

Aspect 6: The method of any of aspects 2 through 5, further comprising: performing a received power measurement procedure for the plurality of sidelink reference signals, the plurality of DMRSs, or a combination thereof; and initiating a BFR procedure based at least in part on a beam failure that is triggered based at least in part on one or more reference signal measurements and a measurement threshold.

Aspect 7: The method of any of aspects 2 through 6, further comprising: decoding a plurality of sidelink channels associated with the plurality of DMRSs; and initiating a BFR procedure based at least in part on a beam failure that is triggered based at least in part on the decoding of the plurality of sidelink channels and an error threshold.

Aspect 8: The method of any of aspects 2 through 7, wherein the plurality of sidelink reference signals and a plurality of sidelink channels associated with the plurality of DMRSs are TDMed in a slot.

Aspect 9: The method of any of aspects 1 through 8, further comprising: receiving, from the second UE via a second set of time-frequency resources, a plurality of DMRSs associated with a sidelink channel, wherein the second set of time-frequency resources at least partially overlaps the set of time-frequency resources.

Aspect 10: The method of aspect 9, wherein receiving the plurality of DMRSs comprises: receiving one or more DMRSs of the plurality of DMRSs via a subset of the second set of time-frequency resources, wherein the subset overlaps the set of time-frequency resources.

Aspect 11: The method of any of aspects 9 through 10, wherein a time-frequency resource of the set of time-frequency resources is replaced with the sidelink channel associated with the plurality of DMRSs based at least in part on the sidelink channel being associated with a same transmit beam as a sidelink reference signal associated with the time-frequency resource.

Aspect 12: The method of any of aspects 1 through 11, wherein the plurality of sidelink reference signals are received semi-persistently, aperiodically, or according to a periodicity based at least in part on the sidelink beam management configuration.

Aspect 13: A method for wireless communications at a first UE, comprising: transmitting, using a plurality of transmit beams of the first UE and via a set of time-frequency resources associated with a sidelink beam management configuration of the first UE, a plurality of sidelink reference signals for a sidelink beam management procedure, the sidelink beam management procedure being between the first UE and a second UE in accordance with the sidelink beam management configuration; and receiving, from the second UE, a sidelink message in response to the plurality of sidelink reference signals, the sidelink message comprising feedback for the plurality of sidelink reference signals, wherein the sidelink message indicates beam management information corresponding to the plurality of sidelink reference signals based at least in part on the sidelink beam management configuration.

Aspect 14: The method of aspect 13, further comprising: transmitting, using the plurality of transmit beams and via a second set of time-frequency resources, a plurality of DMRSs associated with a sidelink channel, wherein the second set of time-frequency resources is non-overlapping with the set of time-frequency resources.

Aspect 15: The method of aspect 14, wherein the sidelink beam management procedure is based at least in part on the plurality of sidelink reference signals, the plurality of DMRSs, or both.

Aspect 16: The method of any of aspects 14 through 15, wherein the feedback indicates a plurality of received power measurements associated with the plurality of transmit beams based at least in part on the plurality of sidelink reference signals, the plurality of DMRSs, or both.

Aspect 17: The method of any of aspects 14 through 16, wherein the feedback indicates resources associated with at least one transmit beam of the plurality of transmit beams based at least in part on the plurality of sidelink reference signals, the plurality of DMRSs, or both.

Aspect 18: The method of any of aspects 14 through 17, wherein the plurality of sidelink reference signals and a plurality of sidelink channels associated with the plurality of DMRSs are TDMed in a slot.

Aspect 19: The method of any of aspects 13 through 18, further comprising: transmitting, using the plurality of transmit beams and via a second set of time-frequency resources, a plurality of DMRSs associated with a sidelink channel, wherein the second set of time-frequency resources at least partially overlap the set of time-frequency resources.

Aspect 20: The method of aspect 19, wherein transmitting the plurality of DMRSs comprises: transmitting one or more DMRSs of the plurality of DMRSs via a subset of the second set of time-frequency resources, wherein the subset overlaps the set of time-frequency resources.

Aspect 21: The method of any of aspects 19 through 20, wherein a time-frequency resource of the set of time-frequency resources is replaced with the sidelink channel associated with the plurality of DMRSs based at least in part on the sidelink channel being associated with a same transmit beam as a sidelink reference signal associated with the time-frequency resource.

Aspect 22: The method of any of aspects 13 through 21, wherein the plurality of sidelink reference signals are transmitted semi-persistently, aperiodically, or according to a periodicity based at least in part on the sidelink beam management configuration.

Aspect 23: A first UE for wireless communications, comprising one or more memories storing processor-executable code; and one or more processors coupled with the one or more memories and individually or collectively operable to execute the code to cause the first UE to perform a method of any of aspects 1 through 12.

Aspect 24: A first UE for wireless communications, comprising at least one means for performing a method of any of aspects 1 through 12.

Aspect 25: A non-transitory computer-readable medium storing code for wireless communications at a first UE, the code comprising instructions executable by one or more processors to perform a method of any of aspects 1 through 12.

Aspect 26: A first UE for wireless communications, comprising one or more memories storing processor-executable code; and one or more processors coupled with the one or more memories and individually or collectively operable to execute the code to cause the first UE to perform a method of any of aspects 13 through 22.

Aspect 27: A first UE for wireless communications, comprising at least one means for performing a method of any of aspects 13 through 22.

Aspect 28: A non-transitory computer-readable medium storing code for wireless communications at a first UE, the code comprising instructions executable by one or more processors to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE) for wireless communications, comprising:

one or more memories storing processor-executable code; and one or more processors coupled with the one or more memories and individually or collectively operable to execute the code to cause the first UE to:

receive, from a second UE via a first set of time-frequency resources associated with a sidelink beam management configuration, a plurality of sidelink reference signals for a sidelink beam management procedure, the sidelink beam management procedure being between the first UE and the second UE in accordance with the sidelink beam management configuration;

receive, from the second UE via a second set of time-frequency resources, a plurality of demodulation reference signals associated with a plurality of sidelink channels, wherein the second set of time-frequency resources is non-overlapping with the first set of time-frequency resources, and wherein the plurality of sidelink reference signals and the plurality of sidelink channels associated with the plurality of demodulation reference signals are time division multiplexed in a slot; and transmit, to the second UE and as part of the sidelink beam management procedure, a sidelink message in response to the plurality of sidelink reference signals and the plurality of demodulation reference signals, the sidelink message comprising feedback for the plurality of sidelink reference signals, the plurality of demodulation reference signals, or both, wherein the sidelink message indicates beam management information corresponding to the plurality of sidelink reference signals, the plurality of demodulation reference signals, or both based at least in part on the sidelink beam management configuration.

2. The first UE of claim 1, wherein the one or more processors are individually or collectively further operable to execute the code to cause the first UE to:

perform the sidelink beam management procedure using the plurality of sidelink reference signals, the plurality of demodulation reference signals, or both.

3. The first UE of claim 1, wherein the one or more processors are individually or collectively further operable to execute the code to cause the first UE to:

perform a received power measurement procedure for the plurality of sidelink reference signals, the plurality of demodulation reference signals, or a combination thereof, wherein the sidelink message indicates one or more received power measurements associated with the received power measurement procedure.

4. The first UE of claim 1, wherein the feedback indicates resources associated with a reference signal measurement that exceeds a measurement threshold.

5. The first UE of claim 1, wherein the one or more processors are individually or collectively further operable to execute the code to cause the first UE to:

perform a received power measurement procedure for the plurality of sidelink reference signals, the plurality of demodulation reference signals, or a combination thereof; and initiate a beam failure recovery procedure based at least in part on a beam failure that is triggered based at least in part on one or more reference signal measurements and a measurement threshold.

6. The first UE of claim 1, wherein the one or more processors are individually or collectively further operable to execute the code to cause the first UE to:

decode the plurality of sidelink channels associated with the plurality of demodulation reference signals; and initiate a beam failure recovery procedure based at least in part on a beam failure that is triggered based at least in part on the decoding of the plurality of sidelink channels and an error threshold.

7. The first UE of claim 1, wherein the plurality of sidelink reference signals and the plurality of sidelink channels associated with the plurality of demodulation reference signals are time division multiplexed in a slot such that the first UE receives the plurality of sidelink reference signals and the plurality of demodulation reference signals.

8. The first UE of claim 1, wherein the plurality of sidelink reference signals are received semi-persistently, aperiodically, or according to a periodicity based at least in part on the sidelink beam management configuration.

9. A first user equipment (UE) for wireless communications, comprising:

one or more memories storing processor-executable code; and one or more processors coupled with the one or more memories and individually or collectively operable to execute the code to cause the first UE to:

transmit, using a plurality of transmit beams of the first UE:

a subset of a plurality of sidelink reference signals for a sidelink beam management procedure via a subset of a first set of time-frequency resources associated with a sidelink beam management configuration of the first UE, wherein:

the sidelink beam management procedure is between the first UE and a second UE in accordance with the sidelink beam management configuration; and the subset of the first set of time-frequency resources is non-overlapping with a second set of time-frequency resources;

a first subset of a plurality of demodulation reference signals associated with a plurality of sidelink channels via a first subset of the second set of time-frequency resources, wherein the first subset of the second set of time-frequency resources is non-overlapping with the first set of time-frequency resources; and a second subset of the plurality of demodulation reference signals via a second subset of the second set of time-frequency resources, wherein the second subset of the second set of time-frequency resources overlaps with the first set of time-frequency resources, and wherein at least one time-frequency resource of the first set of time-frequency resources is replaced with at least one sidelink channel of the plurality of sidelink channels associated with the plurality of demodulation reference signals;

wherein the subset of the plurality of sidelink reference signals and the plurality of sidelink channels associated with the plurality of demodulation reference signals are time division multiplexed in a slot; and receive, from the second UE, a sidelink message in response to the plurality of sidelink reference signals and the plurality of demodulation reference signals, the sidelink message comprising feedback for the plurality of sidelink reference signals, the plurality of demodulation reference signals, or both, wherein the sidelink message indicates beam management information corresponding to the plurality of sidelink reference signals, the plurality of demodulation reference signals, or both based at least in part on the sidelink beam management configuration.

10. The first UE of claim 9, wherein the sidelink beam management procedure is based at least in part on the plurality of sidelink reference signals, the plurality of demodulation reference signals, or both.

11. The first UE of claim 9, wherein the feedback indicates a plurality of received power measurements associated with the plurality of transmit beams based at least in part on the plurality of sidelink reference signals, the plurality of demodulation reference signals, or both.

12. The first UE of claim 9, wherein the feedback indicates resources associated with at least one transmit beam of the plurality of transmit beams based at least in part on the plurality of sidelink reference signals, the plurality of demodulation reference signals, or both.

13. The first UE of claim 9, wherein the subset of the plurality of sidelink reference signals and the plurality of sidelink channels associated with the plurality of demodulation reference signals are time division multiplexed in a slot such that the first UE transmits the subset of the plurality of sidelink reference signals and the plurality of demodulation reference signals.

14. The first UE of claim 9, wherein the at least one time-frequency resource of the first set of time-frequency resources is replaced with the at least one sidelink channel of the plurality of sidelink channels associated with the plurality of demodulation reference signals based at least in part on the at least one sidelink channel being associated with a same transmit beam as a sidelink reference signal associated with the at least one time-frequency resource.

15. The first UE of claim 9, wherein the plurality of sidelink reference signals are transmitted semi-persistently, aperiodically, or according to a periodicity based at least in part on the sidelink beam management configuration.

16. A method for wireless communications at a first user equipment (UE), comprising:

receiving, from a second UE via a first set of time-frequency resources associated with a sidelink beam management configuration, a plurality of sidelink reference signals for a sidelink beam management procedure, the sidelink beam management procedure being between the first UE and the second UE in accordance with the sidelink beam management configuration;

receiving, from the second UE via a second set of time-frequency resources, a plurality of demodulation reference signals associated with a plurality of sidelink channels, wherein the second set of time-frequency resources is non-overlapping with the first set of time-frequency resources, and wherein the plurality of sidelink reference signals and the plurality of sidelink channels associated with the plurality of demodulation reference signals are time division multiplexed in a slot; and transmitting, to the second UE and as part of the sidelink beam management procedure, a sidelink message in response to the plurality of sidelink reference signals and the plurality of demodulation reference signals, the sidelink message comprising feedback for the plurality of sidelink reference signals, the plurality of demodulation reference signals, or both, wherein the sidelink message indicates beam management information corresponding to the plurality of sidelink reference signals, the plurality of demodulation reference signals, or both based at least in part on the sidelink beam management configuration.

17. The method of claim 16, further comprising:

performing the sidelink beam management procedure using the plurality of sidelink reference signals, the plurality of demodulation reference signals, or both.

18. The method of claim 16, further comprising:

performing a received power measurement procedure for the plurality of sidelink reference signals, the plurality of demodulation reference signals, or a combination thereof, wherein the sidelink message indicates one or more received power measurements associated with the received power measurement procedure.

19. A method for wireless communications at a first user equipment (UE), comprising:

transmitting, using a plurality of transmit beams of the first UE:

a subset of a plurality of sidelink reference signals for a sidelink beam management procedure via a subset of a first set of time-frequency resources associated with a sidelink beam management configuration of the first UE, wherein:

the sidelink beam management procedure is between the first UE and a second UE in accordance with the sidelink beam management configuration; and the subset of the first set of time-frequency resources is non-overlapping with a second set of time-frequency resources;

a first subset of a plurality of demodulation reference signals associated with a plurality of sidelink channels via a first subset of the second set of time-frequency resources, wherein the first subset of the second set of time-frequency resources is non-overlapping with the first set of time-frequency resources; and a second subset of the plurality of demodulation reference signals via a second subset of the second set of time-frequency resources, wherein the second subset of the second set of time-frequency resources overlaps with the first set of time-frequency resources, and wherein at least one time-frequency resource of the first set of time-frequency resources is replaced with at least one sidelink channel of the plurality of sidelink channels associated with the plurality of demodulation reference signals;

wherein the subset of the plurality of sidelink reference signals and the plurality of sidelink channels associated with the plurality of demodulation reference signals are time division multiplexed in a slot; and receiving, from the second UE, a sidelink message in response to the plurality of sidelink reference signals and the plurality of demodulation reference signals, the sidelink message comprising feedback for the plurality of sidelink reference signals, the plurality of demodulation reference signals, or both, wherein the sidelink message indicates beam management information corresponding to the plurality of sidelink reference signals, the plurality of demodulation reference signals, or both based at least in part on the sidelink beam management configuration.

20. The method of claim 19, wherein the sidelink beam management procedure is based at least in part on the plurality of sidelink reference signals, the plurality of demodulation reference signals, or both.

21. The method of claim 19, wherein the feedback indicates a plurality of received power measurements associated with the plurality of transmit beams based at least in part on the plurality of sidelink reference signals, the plurality of demodulation reference signals, or both.

* * * * *